(12) United States Patent
Forslöw

(10) Patent No.: US 6,973,057 B1
(45) Date of Patent: Dec. 6, 2005

(54) PUBLIC MOBILE DATA COMMUNICATIONS NETWORK

(75) Inventor: Jan E. Forslöw, Menlo Park, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/484,426

(22) Filed: Jan. 18, 2000

Related U.S. Application Data

(60) Provisional application No. 60/132,496, filed on May 4, 1999, provisional application No. 60/117,861, filed on Jan. 29, 1999.

(51) Int. Cl.[7] .......................... H04Q 7/00; H04Q 7/20; H04L 12/28; H04J 3/16
(52) U.S. Cl. ...................... 370/328; 370/392; 370/465; 455/432.1; 455/435.1
(58) Field of Search ............................... 370/389, 351, 370/392, 395.52, 328, 352, 401, 402, 403, 370/464–465, 310, 901, 912, 400; 455/414–415, 455/432–3, 435, 456, 461, 465, 432.1, 435.1

(56) References Cited

U.S. PATENT DOCUMENTS

| | | | |
|---|---|---|---|
| 5,793,762 A | 8/1998 | Penners et al. | |
| 6,101,543 A * | 8/2000 | Alden et al. ................. | 709/229 |
| 6,161,008 A * | 12/2000 | Lee et al. .................... | 455/414 |
| 6,199,045 B1 * | 3/2001 | Giniger et al. ................. | 705/1 |
| 6,243,758 B1 * | 6/2001 | Okanoue ..................... | 709/238 |
| 6,260,070 B1 * | 7/2001 | Shah .......................... | 709/230 |
| 6,385,170 B1 * | 5/2002 | Chiu et al. ................... | 370/235 |
| 6,407,988 B1 * | 6/2002 | Agraharam et al. ........ | 370/328 |
| 6,408,001 B1 * | 6/2002 | Chuah et al. ................ | 370/392 |
| 6,425,010 B1 * | 7/2002 | Alles et al. .................. | 709/225 |
| 6,442,588 B1 * | 8/2002 | Clark et al. .................. | 709/203 |
| 6,466,985 B1 * | 10/2002 | Goyal et al. ................. | 709/238 |
| 6,484,211 B2 * | 11/2002 | Turunen ....................... | 709/245 |
| 6,487,595 B1 * | 11/2002 | Turunen et al. .............. | 709/226 |

(Continued)

FOREIGN PATENT DOCUMENTS

GB WO 99/31853 * 6/1999 ........... H04L 29/06

(Continued)

OTHER PUBLICATIONS

Ryan, Multiprotocol Label Switching (MPLS), 1998, The Applied Technologies Group, Inc.*

(Continued)

*Primary Examiner*—Chi Pham
*Assistant Examiner*—Ronald Abelson
(74) *Attorney, Agent, or Firm*—Nixon & Vanderhye P.C.

(57) ABSTRACT

A public mobile access data network provides a mobile node data access to the Internet and data access to the mobile node from the Internet even when a point of attachment of the mobile node to the public mobile access data network changes. A public mobility management service is provided to locate mobile nodes so that the Internet is aware of the mobile node's current point of attachment. Advantageously, this public mobility management service is provided independently of mobility services offered by radio access, technology-specific networks. The public mobile access service is implemented using a home agent/foreign agent model where the home and foreign agents transfer data packets over the public mobile access network via a data tunnel. In a preferred, example embodiment, mobile Internet protocol (IP) is used at the network protocol layer to provide the public mobility service. The mobile IP packets are carried using multi-protocol label path switching (MPLS) label switched paths (LSPs) which provide a number of benefits such as tunneling flexibility, configurability, and efficiency.

53 Claims, 12 Drawing Sheets

U.S. PATENT DOCUMENTS

| | | | |
|---|---|---|---|
| 6,493,317 B1 * | 12/2002 | Ma | 370/237 |
| 6,496,505 B2 * | 12/2002 | La Porta et al. | 370/392 |
| 6,507,577 B1 * | 1/2003 | Mauger et al. | 370/356 |
| 6,512,754 B2 * | 1/2003 | Feder et al. | 370/338 |
| 6,522,627 B1 * | 2/2003 | Mauger | 370/230 |
| 6,526,091 B1 * | 2/2003 | Nystrom et al. | 375/142 |
| 6,549,522 B1 * | 4/2003 | Flynn | 370/313 |
| 6,571,289 B1 * | 5/2003 | Montenegro | 709/227 |
| 6,618,353 B2 * | 9/2003 | Merrill et al. | 370/225 |
| 6,674,744 B1 * | 1/2004 | Doshi et al. | 370/352 |
| 6,711,152 B1 * | 3/2004 | Kalmanek et al. | 370/351 |

FOREIGN PATENT DOCUMENTS

| | | | | |
|---|---|---|---|---|
| WO | 98/43446 A2 | 10/1998 | | |
| WO | 00/18154 A2 | 3/2000 | | |
| WO | 00/18155 A2 | 3/2000 | | 370/329 |

OTHER PUBLICATIONS

Juniper Networks Products & Services, Multiprotocol Label Switching: Enhancing Routing in the New Public Network, Executive Summary, Chuck Semeria, Marketing Engineer, pp. 1-17.

Juniper Networks Products & Services, "Traffic Engineering for the New Public Network", pp. 1-20.

Juniper Networks Products & Services, "Optimizing Routing Software for Reliable Internet Growth", Chuck Semeria and John W. Stewart III, Marketing Engineers, pp. 1-33.

Tutorial:Mobile IP, Sidebar to Mobile Networking Through Mobile IP tutorial Nomadicity: How Mobility Will Affect the Protocol Stack, Charles E. Perkins, pp. 1-4.

Tutorial:Mobile IP, "Mobile Networking Through Mobile IP", Charles E. Perkins, pp. 1-16.

B. Adoba et al., "The Network Access Identifier", Internet-Draft, draft-ietf-roamops-nai-11.txt, Jul. 1998, pp. 1-7.

D. Awduche et al., "Extensions to RSVP for Traffic Engineering", Internet-Draft, draft-swallow-mpls-rsvp-trafeng-00.txt, Aug. 1998.

Calhoun et al., "Tunnel Establishment Protocol". Internet-Draft, draft-ietf-mobileip-calhoun-tep-01.txt, Mar. 1998, pp. 1-30.

Calhoun et al., "Diameter Mobile IP Extensions".Internet-Draft,draft-calhoun-diameter-mobileip-00.txt, Jul. 1998, pp. 1-30.

Calhoun et al., "Diameter".Internet-Draft,draft-calhoun-diameter-04.txt, Jul. 1998, pp. 1-59.

Chambless et al., "Home Agent Redundancy Protocol". Internet-Draft, draft-chambless-mobileip-harp-00.txt, Oct. 1997, pp. 1-15.

Davie et al., "Use of Label Switching with RSVP".Internet-Draft, draft-ietf-mpls-rsvp-00.txt, Mar. 1998, pp. 1-12.

T. Li et al., "A Provider Architecture for Differentiated Services and Traffic Engineering (PASTE)".RFC 2430, Oct. 1998, pp. 1-14.

E. Rosen et al. "Multiprotocol Label Switching Architecture".Internet-Draft, draft-ietf-mpls-arch-02.txt, Jan. 2001, pp. 1-55.

C. Perkins, "IP Mobility Support".RFC 2002, Oct. 1996, pp. 1-69.

C. Perkins, "Route Optimization in Mobile-IP".Internet-Draft,draft-ietf-mobileip-optim-07.txt, Nov. 1997, pp. 1-23.

* cited by examiner

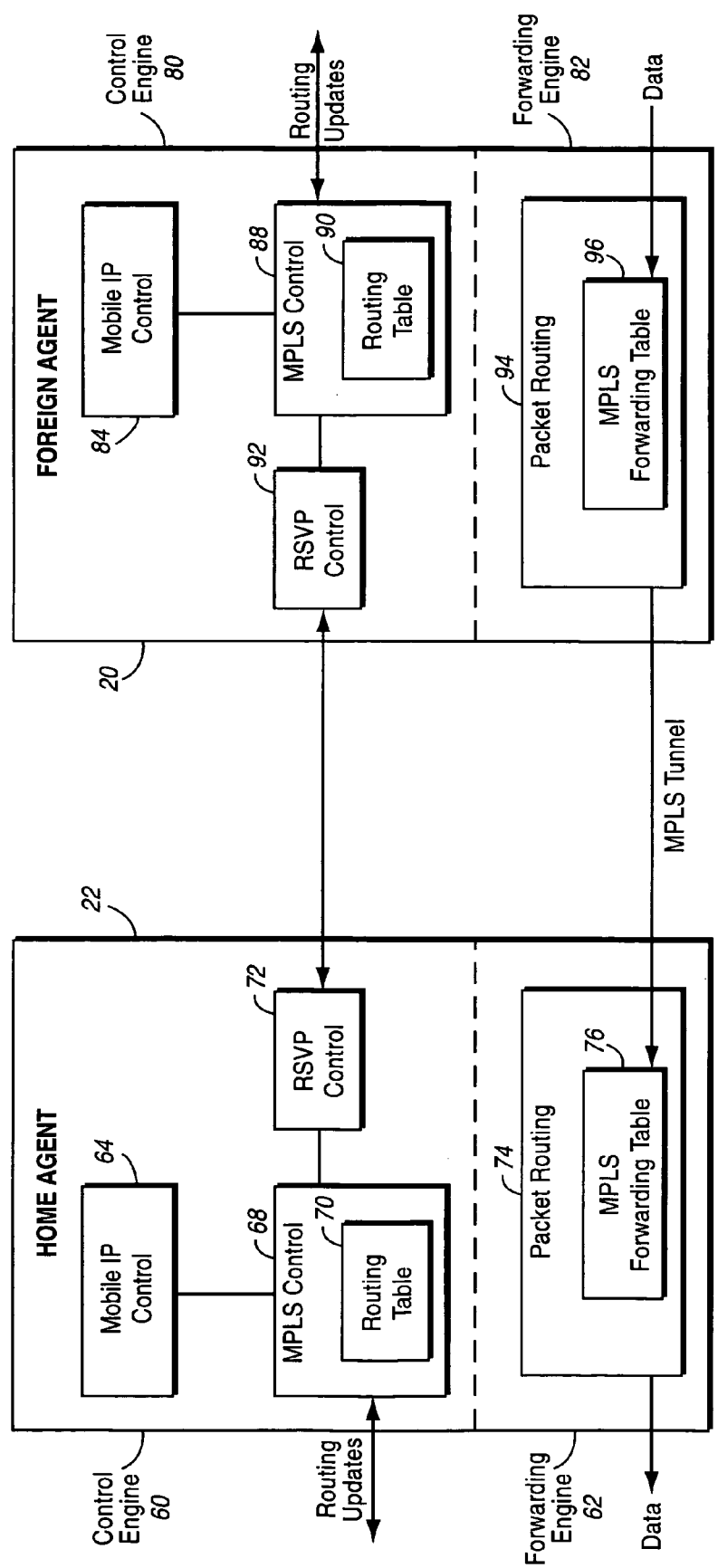

| MPLS FORWARDING TABLE | | | |
|---|---|---|---|
| In Interface | In Label | Out Interface | Out Label |
| ⋮ | ⋮ | ⋮ | ⋮ |
| 3 | 4 | 5 | 7 |
| ⋮ | ⋮ | ⋮ | ⋮ |

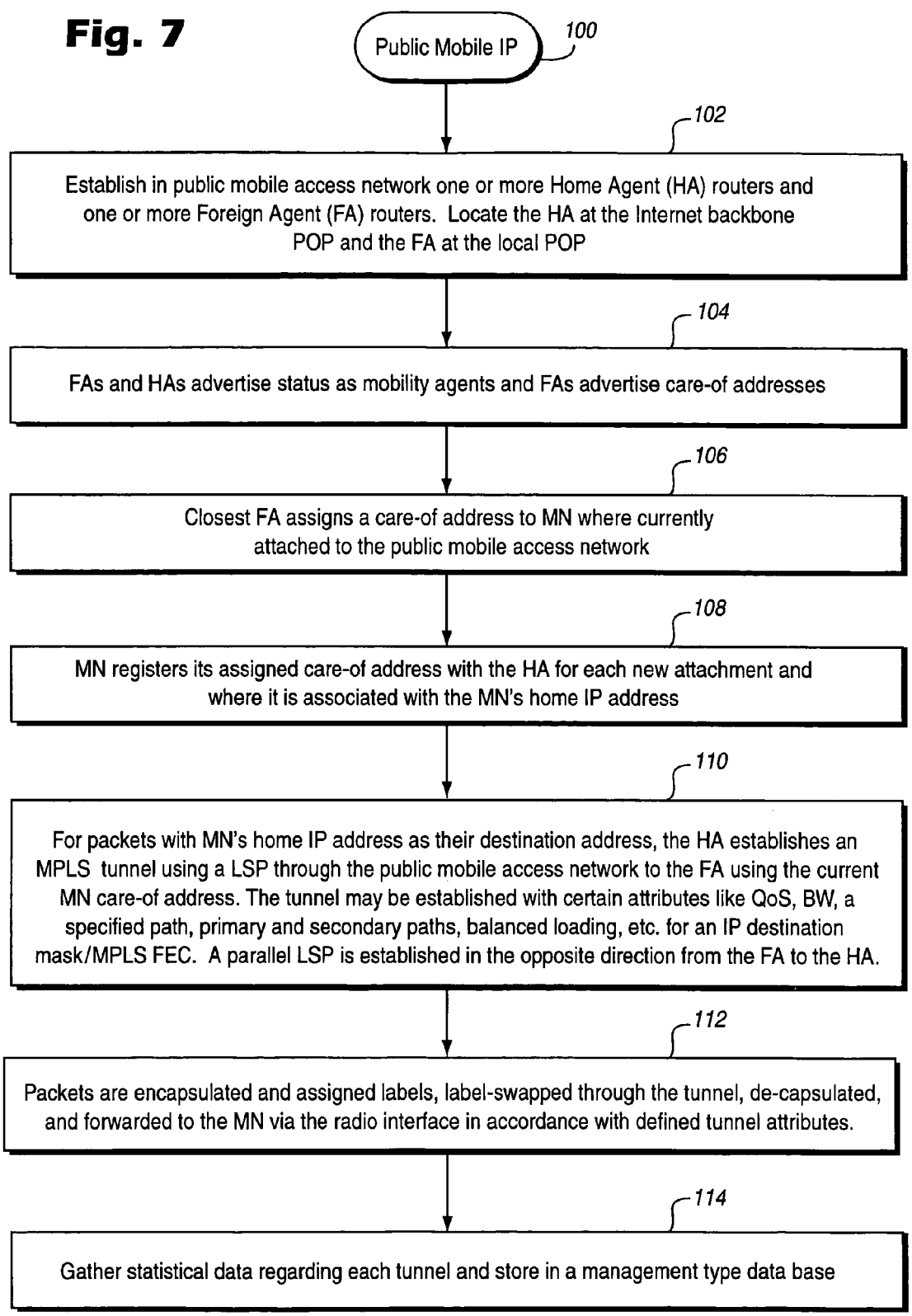

Fig. 9

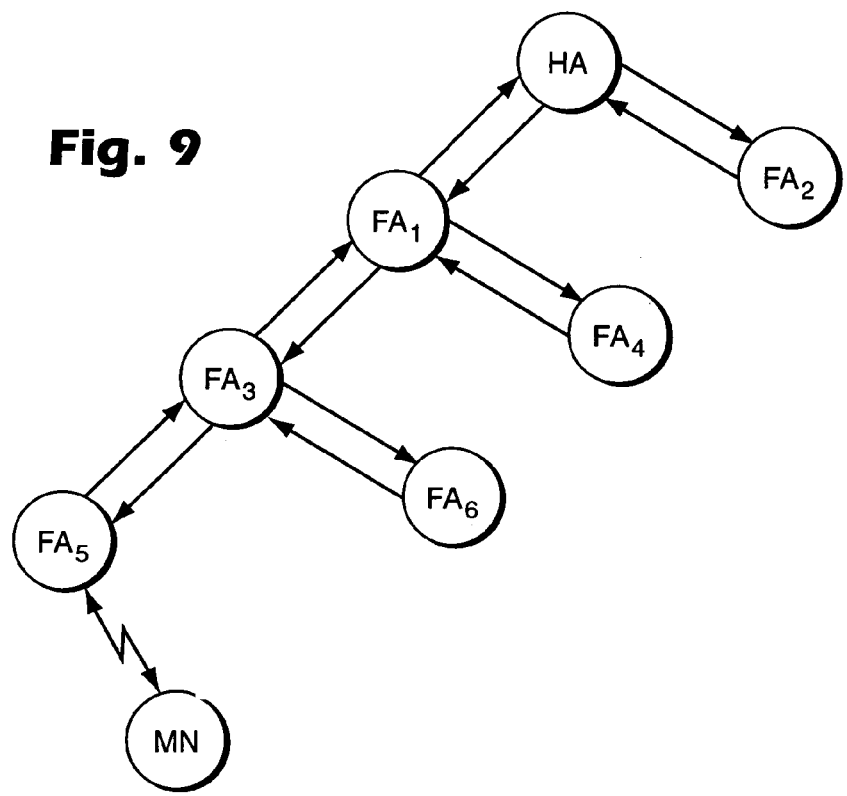

```
                TUNNEL REGIONALIZATION          ╮─150
                                                │
                            ▼
┌─────────────────────────────────────────────────────────┐ ╭─152
│ Merge label switched paths from plural regional foreign │
│ agents (FAs) in the upstream direction towards the home │
│                      agent (HA)                         │
└─────────────────────────────────────────────────────────┘
                            │
                            ▼
┌─────────────────────────────────────────────────────────┐ ╭─154
│  HA encapsulates the label associated with local FA     │
│  (e.g., FA5) into an additional set of labels           │
│  associated with regional FAs (e.g., FA1 - FA6). The    │
│  downstream label switched paths to FA1 - FA6 are       │
│  therefore aggregated in a tree type hierarchy          │
│  rather than using parallel paths/tunnels.              │
└─────────────────────────────────────────────────────────┘
```

Fig. 10

PUBLIC MOBILE DATA COMMUNICATIONS NETWORK

This application claims benefit of Provisional Application 60/117,861, filed Jan. 29, 1999 and 60/132,496, filed May 4, 1999.

TECHNICAL FIELD

The present invention relates to data communications in general, and more specifically, the present invention describes a public data access network that provides mobility management for mobile nodes.

BACKGROUND AND SUMMARY

The Internet offers access to a huge variety of information resources from global information sources. Typically, users make that access from a fixed location such as their home, business, or school. However, cellular telephones, coupled with an increasing variety of other wireless devices, such as wireless laptops and personal digital assistants (PDAs), are changing otherwise fixed points of access to the Internet to include mobile access by these types of mobile nodes. The evolution that has taken place in telephony-based voice communications between fixed point, wireline voice communications over the public switched telephone network (PSTN) to wireless mobile radio communications must take place in the arena of data communications, e.g., wireless communication with the Internet or other data networks. In mobile data networking, it is desirable that communication activities not be disrupted when a mobile user changes the user's point of attachment to the Internet. Instead, there should be a seamless, transparent reconnection between the mobile node in the Internet that occurs automatically.

This mobile computing and networking frees people to work and communicate in a variety of different and non-traditional environments. However, the evolution of mobile networks differs from the evolution of cellular-type telephone communications at a fundamental level. Voice communications employ dedicated-type channels allocated for the duration of the communication with a mobile telephone. In contrast, data communications are packet-based, and packets are delivered individually using a "best effort" following the well-known, layer 3, Internet protocol (IP). The Internet protocol interconnects Internet "provider" networks and routes data packets to their final destinations according to IP addresses. These IP addresses are associated with a fixed network location. However, when a data packet destination is a mobile node, each new point of attachment by the mobile node to the Internet is associated with a new IP address creating a problem for "transparent" mobility.

How the location of mobile nodes is tracked and managed by a network is often referred to as mobility management. Mobility management solutions for data communications have been proposed by cellular standards bodies for the GSM Packet Radio System (GPRS) and the Universal Mobile Telecommunications System (UMTS). But these solutions are proprietary and radio access technology specific. A more generic, standardized approach to transparent mobility management is desirable that is not dependent on radio access technology.

The Internet Engineering Task Force (IETF) has defined a set of standards for mobility within IP networks collectively referred to as Mobile IP (MIP). In general, the Internet protocol routes packets from a source to a destination by allowing routers to forward data packets from incoming network interfaces to outbound network interfaces according to routing tables. The routing tables maintain the next-hop (outbound interface) information for each destination IP address. The IP address carries with it information that specifies the mobile node's point of attachment through the network. Thus, to maintain existing transport protocol layer connections as the mobile node moves, the mobile node's IP address must remain the same. On the other hand, correct delivery of packets to the mobile node's current point of attachment depends on a network identifier contained in the mobile node's IP address which changes at new points of attachment. To alter the routing of the data packets intended for the mobile node to a new point of network attachment requires a new IP address associated with that new point of network attachment.

This mobility addressing dilemma is solved in mobile IP by allowing a mobile node to be associated with two IP addresses: a static, "home" address and a dynamic, "care-of" address that changes at each new point of attachment to the Internet. Only the care-of address changes at each new point of attachment. The static, home IP address assigned to the mobile node makes it appear logically that the mobile node is attached to its home network. In other words, it is the IP address where the mobile node seems reachable to the rest of the Internet.

A home agent router provided in the mobile's home network receives traffic directed to the mobile node's home IP address even when the mobile node is not attached to its home network. When the mobile node is attached to a foreign network, the home agent router routes that traffic to a foreign agent router using the mobile node's dynamic, care-of address. The care-of address, which identifies the mobile node's current, topological point of attachment to the Internet, is used by the foreign agent to route packets to the mobile node. If the mobile node is not attached to a foreign network, the home agent simply arranges to have the packet traffic to be delivered to the mobile node's current point of attachment in the home network. Whenever the mobile node moves its point of attachment, it registers a new care-of address with its home agent.

Packet delivery from the home agent to the foreign agent requires that each packet intended for the mobile node be modified so that the care-of address appears as the IP destination address. When the packet arrives at the mobile node, it will be properly processed by whatever higher level protocol (layer 4) logically receives it from the mobile node's IP (layer 3) IP processing layer. This modification of the packet is sometimes termed a "redirection." The home agent redirects packets from the home network to the care-of address by constructing a new IP header that contains the mobile node's care-of address as the packet's destination IP address. This new header "encapsulates" the original data packet causing the mobile node's home address to have no effect on the encapsulated packet's routing until it arrives at the care-of address. This encapsulation is commonly known as "tunneling" in the sense that the data packet burrows or tunnels using the new header through the Internet—bypassing the usual IP routing mechanisms.

Home agents and foreign agents regularly broadcast "agent advertisements" that include information about one or more care-of addresses. When a mobile node receives an agent advertisement, it receives the IP address of that home or foreign agent. The mobile node may also broadcast an advertisement solicitation that will be answered by any foreign or home agent that receives it. Thus, agent advertisement allows for the detection of mobility agents (home or foreign), lists one or more available care-of addresses, lets the mobile node determine the network number and status of its link to the Internet, and identifies whether the agent is a home agent or a foreign agent. Once a mobile node receives a care-of address, a registration process is used to inform the home agent of the care-of address. The registration allows the home agent to update its routing table to associate or "bind" the mobile's home address, current care-of address, and a registration lifetime.

A foreign agent relays requests and replies back and forth between the home agent and the mobile node. The home agent (the tunnel source) inserts a new tunnel IP header in front of the IP header of any data packet addressed to the mobile node's home address. The new tunnel IP header uses the mobile node's care-of address as the destination IP address (tunnel destination). As a result, to recover the original data packet, the foreign agent simply removes the tunnel IP header and delivers the remaining information to the mobile node using the original IP header.

Mobile IP has been applied to private networks to support mobility management within and between private networks. To the extent the Internet is involved, it simply acts as a "dumb" transport network. However, the inventor of the present invention envisioned using mobile IP to implement a public mobile data access network, e.g., an Internet Service Provider (ISP) network serving mobile nodes, that provides a public mobility service for Internet traffic. That service is termed "public mobile IP" for ease of description. Mobile IP in a public mobile data access network offers a public mobility management service for Internet traffic where a mobile node may physically connect at different points in different access networks while maintaining virtual, seamless IP connectivity with the Internet. The mobile node has no physical home network, and instead employs a virtual home network. Several redundant points of presence in the Internet may act as the home agents for the virtual home network allowing Internet access redundancy as well as optimized routing between the mobile node and other corresponding nodes. Public mobile IP eliminates the need for radio access specific technology, e.g., mobility management nodes in the IP carrier network, and provides a single mobility management solution at the IP network layer for multiple radio access types.

Mobile IP has some drawbacks as a tunneling protocol. Mobile IP employs a generic route encapsulation (GRE) tunneling protocol typically referred to as IP-over-IP. In other words, in the tunnel between the home agent and the foreign agent, the data packet is encapsulated to make a new datagram using a new IP header which is used to tunnel the encapsulated datagram through the home agent-foreign agent tunnel. In IP-over-IP tunneling, the packets corresponding to a particular connection are not sent together over the same path through the network; indeed, individual tunnel packets can be transported over any path. This individual packet processing is not particularly efficient when a large number of packets are going to the same destination.

It is also difficult to specify or otherwise configure certain parameters or constraints for a particular tunnel. For example, it may well be desirable to configure a tunnel in accordance with one or more parameters such as providing a particular quality or class of service, redundant paths (e.g., primary and secondary paths), or a more efficient route by sending packets destined for the same agent by the same path. Regarding the latter parameter, having to look up an IP address for each individual tunnel packet is less efficient than routing a whole group of packets at one time without having to look up individual packet IP addresses. Alternatively, to balance the traffic load among the network routers, it would be useful to be able to route certain packets over certain paths, not just the shortest path. It would also be desirable to evaluate the performance of a tunnel including for example how many packets were delivered, how many packets were lost, where they were lost, etc.

To overcome these drawbacks and to achieve these additional goals in the context of a public mobile IP service, the inventor recognized significant advantages in employing multi-protocol label switching (MPLS) as the tunneling protocol between mobile IP home and foreign agents. MPLS is desirable as a tunneling protocol in the context of public mobile IP because it is generic, rather than proprietary, relatively simple, and allows considerable flexibility in network path selection. As a result, a public mobile Internet service based on MPLS allows network operators to offer new services and features not readily supported by IP-over-IP routing techniques.

MPLS employs two distinct functional components: a control component and a forwarding component. The control component uses standard routing protocols (e.g., Border Gateway Protocol (BGP)) to exchange information with other routers to build and maintain a forwarding table. When data packets arrive, the forwarding component searches the forwarding table maintained by the control component to make a routing decision for each packet. Specifically, the forwarding component examines information contained in the packet's header, searches the forwarding table for a match, and directs the packet from an input interface to an output interface across the router's "switching fabric."

The forwarding component of, MPLS is based on a label swapping algorithm similar to that used in ATM and frame relay switches. A label is a short, fixed length value carried in the packet's header to identify a Forwarding Equivalence Class (FEC). The label is analogous to a connection identifier such as an ATM virtual identifier VPI/VCI or a frame relay DLCI. A label maps traffic to a specific forward equivalence class that defines a set of packets forwarded over the same path through a network even if the ultimate destinations of each product is different. The label swapping forwarding algorithm classifies packets at an ingress edge of the network to assign an initial label to each packet. The label switch (referred also as a label switched router (LSR)) performs a routing table lookup, maps the packet to an FEC, and then assigns a label to the packet before forwarding it to the next LSR in the label switched path (LSP).

A LSP is like a virtual circuit because it defines an ingress-to-egress path through a network that is followed by all packets assigned to a specific FEC. The first LSR in an LSP is called the ingress label switch, and the last LSR is called the egress label switch. Ultimately, LSRs ignore the data packet's network layer header and simply forward the data packet using the label swapping algorithm. When a label packet arrives at an LSR, the forwarding component uses the input port number and label to perform an exact match in its forwarding table. When a match is found, the forwarding component retrieves the outgoing label, the outgoing interface, and the next-hop router address from the forwarding table. The forwarding component then swaps (or replaces) the incoming label with the outgoing label and directs the packet to the outbound interface for transmission to the next hop in the LSP. If the next hop router is not a label switch, the egress LSR discards the label and forwards the packet using conventional longest-match IP forwarding.

Label swapping provides a significant number of benefits compared to conventional network layer routing. In label-switched routers, there is no individual packet IP address lookup to route packets through the tunnel. Label-switching is therefore considerably faster than IP address lookup. There is also better security in label-switched paths compared to IP-over-IP tunnels because the labels used to switch the packets in the tunnel are internal and shared only between two label-switched path routers making it much harder to eavesdrop on a label-switched path. An IP header can be detected and used by a hostile agent to reroute and send traffic using that detected IP header. Another significant advantage of label-switched tunnels is load balancing. Packets and traffic can be controlled and rerouted as necessary by the operator. While IP-over-IP is limited to sending packets by the shortest path, label-switched paths permit consideration of other factors when determining a path including bandwidth, congestion, and redundancy.

The present invention includes a public mobile access data network service that provides a mobile node data access to the Internet and data access to the mobile node from the Internet even when a point of attachment of the mobile node to the public mobile access data network changes. The service includes public mobility management to monitor the location of mobile nodes so that the Internet is aware of each mobile node's current point of attachment. Advantageously, this public mobility management service is provided independently of mobility services offered by radio access technology-specific networks. The public mobile access service is implemented using a home agent/foreign agent model where the home and foreign agents transfer data packets over the public mobile access network via one or more data tunnels. In a preferred, example embodiment, mobile IP is used at the network layer to provide the public mobility service. The mobile IP packets are transported using multi-protocol label path switching label switched paths which provide benefits such as tunneling flexibility, configurability, and efficiency.

In a preferred example embodiment, one or more home agent routers are coupled to a backbone of the Internet. Plural foreign agent routers are preferably located at a local point of presence in the Internet near a radio access point where mobile radio nodes attach. This location is particularly beneficial when the mobile node detaches from the network at one of the foreign agents and reattaches to the network at another of the foreign agents. Other advantageous example configurations include establishing plural home agent routers as a virtual home agent network and co-locating one of the home agents in the virtual home network with a foreign agent router. The foreign agent multicasts binding updates of new care-of addresses to the multiple home agents serving the virtual home network. Each home agent advertises reachability of the mobile node to other corresponding nodes in the Internet. The home agent closest to the corresponding node (e.g., from a routing perspective) is selected to provide optimal routing for packets between the mobile node and the corresponding node. If the selected home agent fails, then a secondary home agent can continue forwarding packets between the mobile node and the corresponding node without interruption.

Using MPLS-based tunnels, various parameters of those tunnels can be configured including for example specifying a particular class of service, bandwidth, selective routing, the establishment of primary and second paths, etc. Label-switched paths from plural regional agents may be merged into one tunnel toward the home agent for efficiency purposes. Similarly, label-switched paths at the home agent destined for plural regional foreign agents may be aggregated into a single tunnel to avoid establishing parallel tunnels between home and foreign agents. The home agent and foreign agent routing nodes include a control engine for establishing a data tunnel across the public mobile data access network as well as a forwarding engine for processing and routing packets over the tunnel.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts throughout. While individual functional blocks and components are shown in many of the figures, those skilled in the art will appreciate these functions may be performed by software modules or programs executed using a suitably programmed digital microprocessor or general purpose computer by individual hardware circuits, by an application specific integrated circuit (ASIC), and/or by one or more digital signaling processors (DSPs).

FIG. 5 is a function block diagram illustrating in further detail control and traffic exchanges between a home agent and a foreign agent;

FIG. 7 is a flowchart diagram illustrating an example, non-limiting mobile IP service procedure;

FIG. 9 is a diagram illustrating an example of a regionalized tunnel configuration;

FIG. 10 is a flowchart diagram illustrating an example tunnel regionalization procedure.

DETAILED DESCRIPTION OF THE DRAWINGS

In the following description, for purposes of explanation and not limitation, specific details are set forth, such as particular embodiments, circuits, signal formats, techniques, etc. in order to provide a thorough understanding of the present invention. Although specific protocols are referred to for purposes of facilitating the description, the present invention is not necessarily limited to such specific protocols. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

The present invention provides a public mobile access network to couple mobile nodes with the Internet. The public nature of the invention offers considerably wider appeal and application compared to proprietary, private, mobile access network solutions. The public mobile access to the Internet provided by the present invention has the potential to replace all radio access, technology-specific, Internet mobility management solutions including those employed for example in D-AMPS and GSM/GPRS. Unlike these technologies that provide mobility management in the context of a cellular radio access infrastructure, the present invention supports mobility management within the Internet itself.

Figure 1:
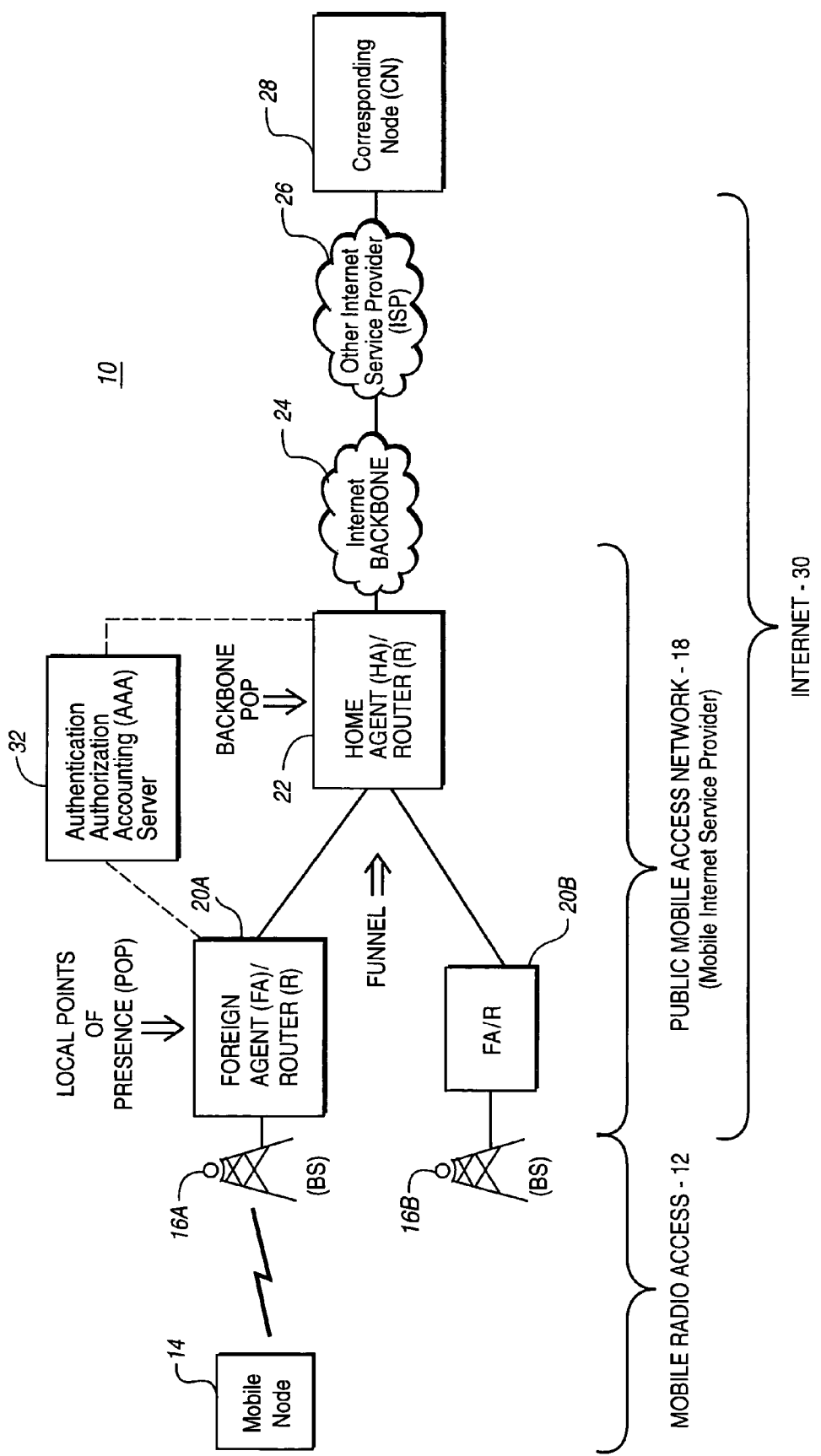
FIG. 1 is a function block diagram illustrating a mobile data communications network in which the present invention may be advantageously employed.

In this regard, reference is made to FIG. 1 which illustrates a data network 10 including a mobile radio access 12 coupled to a public mobile access network 18, which in turn, is part of a larger inter-network commonly identified as Internet 30. In the mobile radio access 12, one or more mobile nodes 14 communicate over a radio interface with one or more radio base stations (BS) 16 using for example some radio access network (such as the UTRAN shown in FIG. 8). The mobile node 14, which may be a mobile radio telephone alone or coupled to a laptop computer or some other wireless device, is shown communicating with base station 16A. Because the mobile node is mobile, it may move to a location where the radio access is switched from base station 16A to 16B.

To provide Internet access to and from mobile node 14, a public mobile access network 18 operated by a mobile Internet service provider interfaces with or couples to the mobile radio access 12. In this example, a foreign agent (FA)/router (R) 20A is coupled to base station 16A and foreign agent/router 20B is coupled to base station 16B. The foreign agents 20 are preferably located at the peripheral border of the overall Internet and are therefore referred to as local points of presence (POPs) of the Internet. In other words, this is the entity with which the mobile node communicates to make Internet access, and in the opposite direction, the entity responsible for routing data to the mobile node from the Internet. The foreign agent routers 20A and 20B form a "funnel" to a home agent (HA) router (R) 20. Most Internet service providers (ISPs) feed traffic to and from the Internet. Since a majority of the total number of data packets in the ISP network exit or enter the ISP network rather than staying within it, the home agent router 22 is preferably located at a backbone point of presence at the narrowing portion of the funnel. By positioning the foreign agent routers as local points of presence in the public mobile access network 18 and the home agent 22 as the backbone point of presence, the present invention optimally deploys routing intelligence at inter-exchange points.

The Internet backbone is also connected to one or more other Internet service providers 26 to which other nodes such as representative, corresponding node (CN) 28 obtain access to the Internet 30. Also included in FIG. 1 is an authentication, authorization, and accounting (AAA) server 32 coupled between each foreign agent 20 and the home agent 22 (only one coupling is shown for purposes of illustration). The AAA server 32 provides a centralized management interface to the network operator for defining subscription options and collecting usage data. An example of a subscription option is a restriction on available home agents and foreign agents for a certain mobile node. An example of usage data collection is the detection of a login to a certain foreign agent by way of an authentication request. In addition, the AAA server 32 can distribute encryption keys for the encryption of data sent between the mobile node, foreign agent, and home agent.

A significant feature of the public mobile access network 18 shown in FIG. 1 is that radio access, technology-specific, mobility management nodes are not required. Instead, the present invention provides a single, non-proprietary, mobility management solution implemented in the IP network layer of the public Internet itself (rather than in a private network). This solution is achieved in a preferred, non-limiting, example embodiment of the present invention using an advantageous combination of mobile IP and multi-protocol label switching protocols.

As described in the background, mobile IP provides a generic, standardized approach for identifying the location of a mobile node so that information can be properly routed between the mobile node and a corresponding node (CN) 28 via the Internet backbone 24 and some other Internet service provider (ISP) 26. The mobile node 14 includes a static, home address used by Internet routers to reach the mobile node. The home IP address assigned to the mobile node makes it logically appear to the Internet 30 that the mobile node is attached to its home network. The home network in FIG. 1 is virtual (rather than physical) and is hosted by the home agent 22. The mobile node 14 accesses the Internet backbone 24 from a foreign network 16 hosted by the foreign agent 20.

To reach the mobile node when it is not attached to its home network, a care-of IP address is associated with the mobile node that identifies the mobile node's current point of attachment to the Internet. In FIG. 1, the home agent 22 uses the mobile node's care-of address to route data packets, received with the mobile node's home address, to the foreign agent 20A. If the mobile node 14 moves and registers its new location via a new base station 16B with a new foreign agent 20B, the mobile node 14 also registers a new care-of address with home agent 22 by way of the base station 16B and the foreign agent 20B. The home agent therefore simply delivers data packets intended for the mobile station using the current care-of address registered by the mobile node.

By deploying foreign agent routers in the public mobile access network as shown in FIG. 1, mobile nodes can roam between different public access attachment points as well as to private access networks that employ mobile IP. By placing the home agent in the public mobile access network, optimal data routing to external corresponding nodes as well as private network internal nodes is also achieved. Including the authentication, authorization, and accounting (AAA) server in the public mobile access network, AAA signaling can traverse multiple Internet service provider domains for coordinated authentication and accounting purposes while packet forwarding is performed locally. In addition, public mobile IP does not require any new nodes in the Internet architecture, but instead, may be implemented using enhanced software and a new access paradigm.

Figure 2:
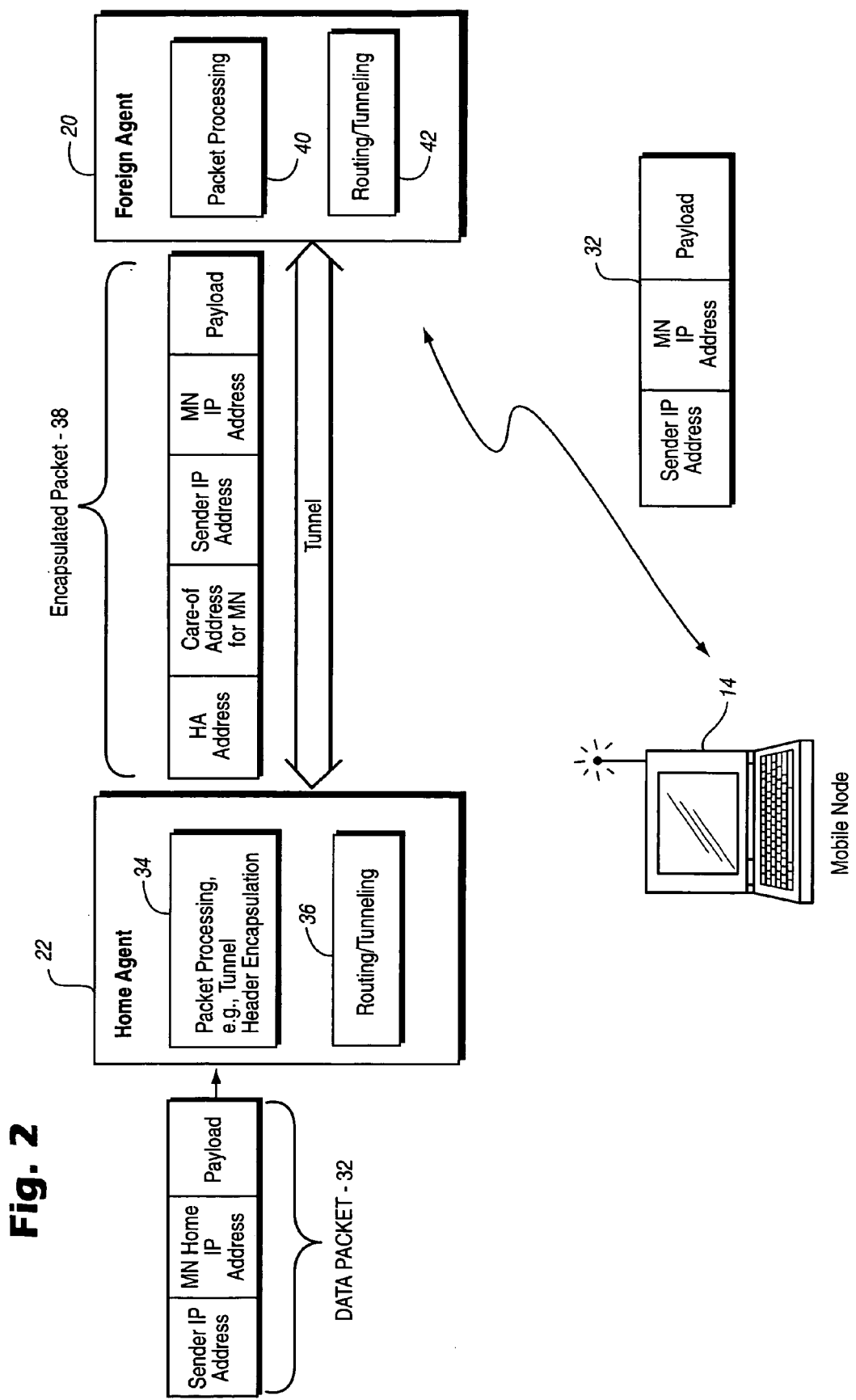
FIG. 2 is a function block diagram illustrating the routing of a packet between a home agent and a foreign agent over a tunnel.

How data packets are conveyed between the home agent 22 and the foreign agent 20 across the public mobile access network 18 is further described in conjunction with FIG. 2. A data packet 32 intended for the mobile node 14 is routed from the sending node via the Internet backbone 24 to the home agent 22 and includes a sender node IP address (i.e., the originator of the data message to the mobile node), the mobile node's home IP address, and the "payload" of the packet that contains part (or all) of the message content. Home agent 22 includes a packet processing control entity 34 and a packet routing control entity 36. The foreign agent likewise includes a packet processing control entity 40 and a packet routing control entity 42. The control entities are preferably (although not necessarily) implemented using software modules managed (e.g., data tables) and executed (e.g., programs) by the home and foreign agent data processing and routing hardware.

The home agent packet processing control entity 34 detects the mobile node home IP address and sends an encapsulated packet 38 by way of routing and tunneling control entity 36 to the foreign agent router 20. The encapsulated packet 38 is conveyed over a "logical" tunnel or path between the home agent 22 and the foreign agent 20 using the care-of address for the mobile node. The IP packet 32 is now the payload portion of the encapsulated packet 38 which is routed to the foreign agent using the care-of address for the mobile node. Conversely, packets from the mobile node 14 are routed in the opposite direction over the tunnel back to the home agent router 22 by the foreign agent packet processing control entity 40 and the packet routing control entity 42 using the home agent (HA) address contained in the encapsulated packet 38.

When the foreign agent 20 receives an encapsulated packet 38, it strips off the home agent address and care-of address and forwards the received data packet 32 to the mobile node 14 over the radio interface. The mobile node then processes data packet 32 using standard Internet protocol software. In the opposite direction, a data packet sent over the radio interface by a mobile node 14 is encapsulated to include a new header with the home agent address and the care-of address for the mobile node and routed over the tunnel to the home agent 22. The home agent packet processing control entity 34 strips off the tunnel header, and the packet routing control entity 36 forwards the data packet to the sender IP address via the Internet backbone 24. In this way, data packets are simply and efficiently tunneled through the public mobile access network 18 to and from the mobile node 14 bypassing the usual, more complicated and time consuming IP data packet routing mechanisms.

In addition to the use of mobile IP to manage the mobility of mobile nodes while providing data access which the Internet to and from mobile nodes, the public mobile access network advantageously employs multi-protocol label switching (MPLS) as the tunneling protocol used between the home agent and the foreign agent to support mobile IP rather than a less flexible and less powerful tunneling protocol like IP-over-IP. An important feature of multi-protocol label switching is the use of label-switched paths (LSP). A label-switched path defines a virtual or logical connection that supports the tunnel between home and foreign agents. Each packet is assigned to a specific forwarding equivalence class (FEC), and therefore, a label is essentially a virtual connection identifier. The label maps data packets into a particular FEC so that the FEC defines a set of packets forwarded over the same routing path, even if their ultimate destinations are different.

Figure 3:
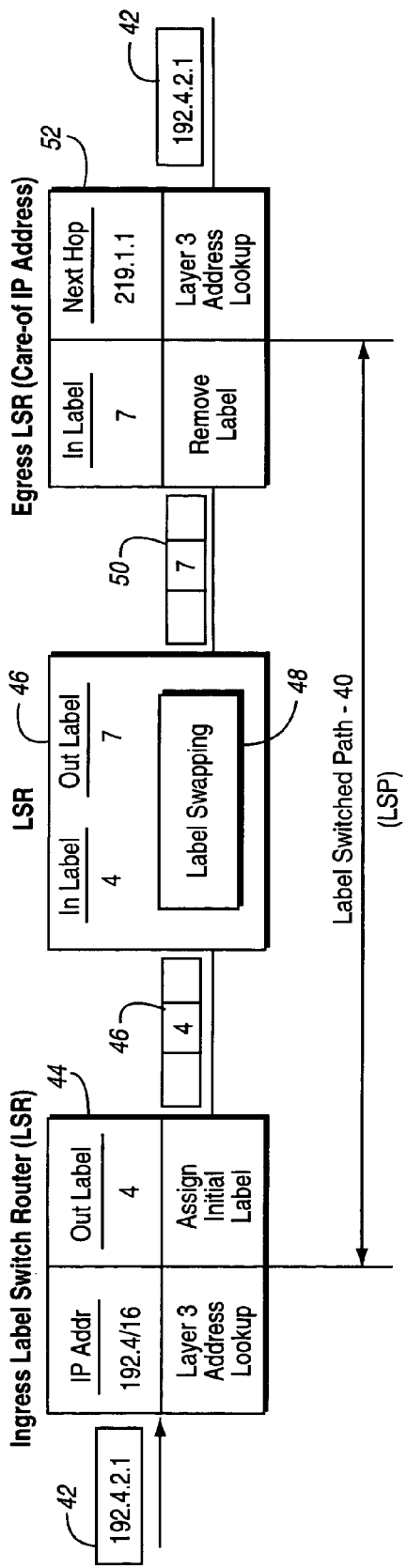
FIG. 3 is a function block diagram illustrating the routing of a data packet over a label-switched path.

A simplified example of an LSP 40 is shown in FIG. 3. Each routing node in the label-switched path is referred to as a label-switched router (LSR). The first LSR 44 is referred to as an ingress LSR and receives an IP data packet 42 having a destination IP address of 192.4.2.1. The IP address 192.4.2.1 falls within the IP destination address range 192.4/16 serviced by the LSP with Out Label 4. All other packets with an IP destination address within the range 192.4/16 are also serviced by the same LSP with Out Label 4. Together they constitute a forward equivalence class (FEC). The IP address of the incoming packet is actually processed by a layer 3 address lookup mechanism corresponding to routing/tunneling entity 36 in FIG. 2. The layer 3 address lookup mechanism hosts a routing table. One entry in the routing table binds the IP address range 192.4/16 with the label-switched path with Out Label 4. When the entry is found, the layer 3 address lookup mechanism forwards the packet to the outgoing interface related to the Out Label. The label assignment is performed by the packet processing entity 34 in FIG. 2 located on the outgoing interface of the ingress LSR.

The ingress LSR 44 analyzes the received data packet 42, performs a routing table lookup, and maps the data packet 42 to an FEC corresponding to a set of IP addresses having the same basic network destination. Each MPLS packet 46 and 50 has an encapsulation header that contains a fixed length label field. Thus, the next LSR 46 in the LSR ignores the data packet 42's IP header and simply forwards the data packet 46 using the packet's label and the label swapping algorithm 48. In other words, the ingress LSR 44 receives the IP packet 42, adds an MPLS header to the packet, and forwards it to the next LSR 46 in the label-switched path 40. The labeled packet 50 is forwarded along the label switched path by the LSR(s) in the LSP until it reaches the egress LSR 52, at which point the MPLS label header 7 is removed, and the packet is forwarded based upon the next hop IP address.

More specifically in this example, the ingress LSR 44 receives the unlabeled packet 42 with a destination address of 192.4.2.1. LSR 44 performs a routing table lookup and maps the packet to an FEC corresponding to an IP destination address range 192.4/16 serviced with Out Label 4. Therefore, the ingress LSR 44 adds label "4" to the packet 42 and forwards the labeled packet 46 to the next LSR 46 in the label-switched path 40. When the labeled packet 46 arrives at LSR 46, LSR 46 uses the label 4 to perform an exact match search in a forwarding table. When a match is found, an outgoing label, which in this example has the value of 7, is swapped or replaced for the incoming label 4. The labeled packet 50 is forwarded to the next hop in the label-switched path, in this case, the egress LSR 52. When the labeled packet 50 arrives at the egress LSR 52, the forwarding table is searched, and if the next hop is not a label-switched router, the egress LSR 54 discards the label 7 and forwards the packet using conventional, longest-match IP forwarding.

Figure 4:
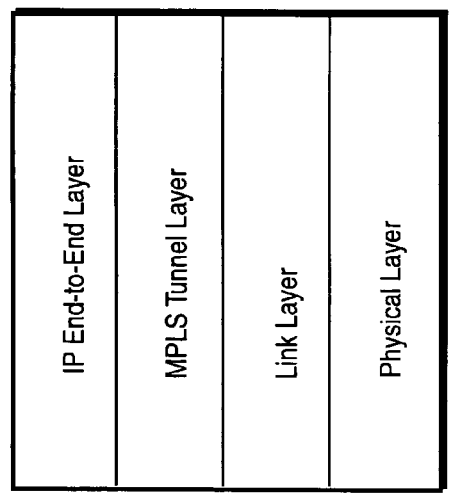
FIG. 4 illustrates a protocol stack for mobile IP over an MPLS tunnel.

According to the present invention, therefore, data packets are communicated from the Internet backbone to the mobile node using mobile IP over MPLS tunnels. The basic protocol stack for mobile IP-over-MPLS is illustrated in FIG. 4 and includes a layer 1 physical layer, a layer 2 link layer, and a layer 3 MPLS tunnel topped by a layer 3 IP end-to-end layer. There is only one tunnel layer rather than both an MPLS tunnel layer and an IP-over-IP tunnel layer. A single tunneling mechanism eliminates the extra transmission overhead associated with two tunneling protocols. In one example embodiment, the MPLS tunnel is unidirectional meaning that at least two tunnels are needed for the communication between a foreign agent and a home agent.

There are a number of advantages associated with mobile IP over an MPLS tunnel. Label swapping gives a network service provider tremendous flexibility in the way that packets are assigned to FECs. While conventional, shortest path IP forwarding may be easily implemented by the ingress label switch assigning a packet to an FEC based on its destination address, the label-switched path is not limited to the shortest path to reach the destination IP address. In addition, packets may also be assigned to an FEC based on a wide variety of service-based considerations including the sender's address, the application type, the point of entry of the packet into the label swapping network, the point of exit from the label swapping network, the class of service conveyed in the packet header, the available bandwidth and desired bandwidth, etc. Service providers may also construct customized label-switched paths to support specific application requirements. For example, label-switched paths can be designed to minimize the number of hops, meet certain bandwidth requirements, support precise performance requirements, bypass potential points of congestion, direct traffic away from a default path, or force traffic across certain links or nodes in the network. Indeed, the ability to take any type of user traffic, associate that traffic with an FEC, and map the FEC to an LSP that has been specifically designed to satisfy the FEC's requirements is a tremendous advantage of the present invention that provides Internet service providers with precise control over the flow of traffic in their networks. This precise control results in increased efficiency and more predictable service for a wider variety of services.

For the home agent to send packets destined for the mobile node to the foreign agent, it uses the mobile's care-of address. In a private mobile IP network, there is only one home agent for one mobile node, and the home agent is located in a specific private home network. A large number of possible foreign networks exist where the relatively few mobile nodes associated with the one home agent can visit. It makes sense in this context for a private mobile IP network to constantly register and de-register care-of addresses in the home agent as the mobile nodes move from one foreign agent to another. Thus, tunnels in private mobile IP are constantly set up and torn down. Between the one home agent and the current foreign agent to which the mobile node is attached, the home agent termination never changes, and the mobile node home address is provisioned in the home agent and is stable.

The situation in a public mobile IP network is different. Several routers belonging to a virtual home network may act as home agents for mobile nodes. The selection of home agent may change depending on routing metrics, quality of service, load balancing, and other considerations. The number of mobile nodes associated with a public mobile IP home agent is much greater than in the private mobile IP situation. As a result, a home agent will likely always have at least several (if not many) mobile nodes attached to each of the foreign agents in its provider network. Therefore, tunnels to the foreign agents are always needed and can be considered stable. The care-of address can, therefore, be provisioned in advance in the home agent. On the other hand, the home agent can not be sure for which mobile nodes it will act as home agent. The selection of home agent may change dynamically based on subscription and/or network conditions. Accordingly, the home address of the mobile node in a public mobile IP network is dynamically injected into the currently selected home agent.

In a public mobile IP solution deploying MPLS as the tunneling protocol, the care-of address becomes the destination address of a label-switched path configured from the home agent to the foreign agent. The care-of address and corresponding label-switched path are provisioned ahead of time and constitute a stable infrastructure for the public mobile IP network. The home network addresses become the IP addresses that are dynamically re-allocated to label-switched paths as the mobile node moves from one foreign agent to another. In the public mobile IP-MPLS solution, the home network addresses of the mobile nodes attached to a foreign agent dynamically create the IP address range for the forwarding equivalence class (FEC) associated with a label-switched path.

FIG. 5 illustrates one preferred, non-limiting, example implementation of mobile IP used in conjunction with MPLS tunnels to communicate data packets between a home agent 22 and a foreign agent 20. The home agent router 22 is divided into a control engine 60 and a forwarding engine 62. The foreign agent router 20 is similarly divided into a control engine 80 and a forwarding engine 82. The control engines communicates with their respective forwarding engines by managing respective MPLS packet forwarding tables 76 and 96 included in respective packet processing control entities 74 and 94. The MPLS tunnel (an LSP) is established between the packet processing entities of the home and foreign agents.

This separation between control and forwarding functions allows the deployment of a simple forwarding algorithm, MPLS label swapping, to be used for multiple services and traffic types. Thus, while the MPLS forwarding infrastructure can remain the same, new services may be added in the MPLS control entities by simply changing the way packets are assigned to a label-switched path. For example, packets may be assigned to a label-switched path based on a combination of the care-of address and application type, a combination of the source and destination address subnetworks, a specific quality of service requirement, an IP multicast group, or a virtual private network (VPN) identifier. In this manner, new services can be easily migrated to operate over the common MPLS forwarding infrastructure.

The control engine 60 of home agent 22 includes a mobile IP control entity 64 in communication with an MPLS control entity 68 having a routing table 70. The routing table 70 receives routing updates from other routers by way of regular routing protocols, such as open shortest path first (OSPF) and the border gateway protocol (BGP). The MPLS control entity 68 is also coupled to a resource reservation protocol (RSVP) control entity 72 which implements a path reservation protocol between the home agent router 22 and the foreign agent router 20 to ensure a certain quality of service for all packets belonging to that connection. In this non-limiting example, the MPLS control entity 68 uses the RSVP control entity 72 to establish the label-switched path shown as an MPLS tunnel between the two forwarding engines 62 and 82 of the home and foreign agent, respectively. The reservation protocol "pins up" the path to be used for all packets transferred between the home agent and the foreign agent. This speeds up the packet forwarding process in intermediate LSRs between the home and foreign agent by replacing a variable length IP address lookup in an IP routing table with a fixed length label swap based on a FEC table. Each FEC corresponds to an aggregated set of IP addresses, which means that the FEC table is smaller in size than the IP address table and thus faster to search. In addition, the reservation protocol allows the network operator to control the selection and routing of the path for each FEC, and as a result, for all packets destined for a set of IP addresses in a manageable way. To perform the corresponding control in a single packet mobile IP routing is difficult, if not impossible, as the behavior of the intermediate routers is not synchronized through the use of a dynamic reservation protocol, but only through static settings on management interfaces of each router. The foreign agent contains similar control entities including a mobile IP control entity 84 coupled to an MPLS control entity 88 having a routing table 90 receiving routing updates. The MPLS control entity 88 is coupled to RSVP control entity 92.

Figures 6A, 6B:
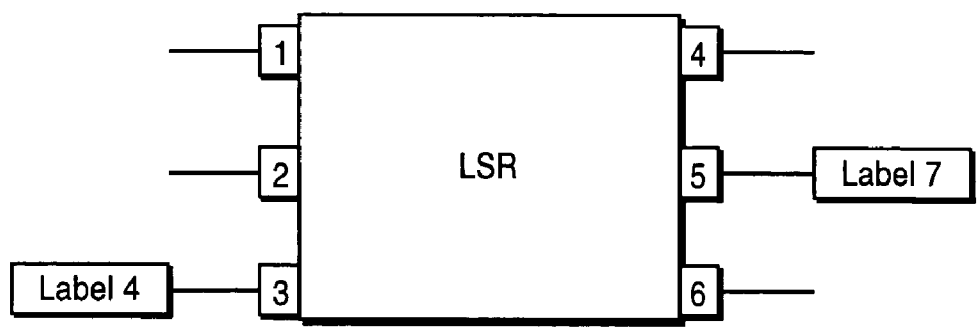
FIG. 6A illustrates an example MPLS forwarding table.
FIG. 6B illustrates a label-switched router forwarding a packet using the MPLS forwarding table shown in FIG. 6A.

The MPLS forwarding tables 76 and 96 shown in the respective packet processing/forwarding engines of the home and foreign agents, respectively, are used to implement the label swapping algorithm referred to above. A simple example is now described in conjunction with FIGS. 6A and 6B. FIG. 6A shows an MPLS forwarding table with four columns: an IN interface, an IN label, an OUT interface, and an OUT label. Numbered interfaces are shown on the LSR in FIG. 6B. When a packet arrives containing a label at the LSR, the routing control entity in the forwarding engine examines the label and uses an index into its MPLS forwarding table. Each interface-label pair is mapped to a set of forwarding information. Here, all packets coming in on IN interface 3 with IN label 4 are mapped to an OUT interface 5 and an OUT label 7. Using the information from the forwarding table shown in FIG. 6A, the LSR replaces the label with a value of 7 and forwards the packet out interface 5 to the next LSR.

An interface is established between the mobile IP control entity and the MPLS control entity in the home agent and in the foreign agent. Preferably, an open applications programming interface (API) is established between both the mobile IP control entity and the MPLS control entity. The open API permits setting the addresses of the foreign agents, i.e. the care-of addresses, that currently host any of the home agent's mobile nodes. As a result, the home agent IP address is stored by each hosting foreign agent. Example, non-limiting procedures for defining hosting foreign agent addresses, sometimes referred to as auto-injection of new destination prefixes for a label-switched path, is described below in the well known BNF syntax. That is, the BNF syntax of a request from the mobile IP control entity to the MPLS control entity is in the form:

```
mpls {
    label-switched-path lsp-path-name {
        to address;
        from address;
        }(1+)
}
```

The lsp-path-name is a name given to the label-switched-path that is being established from the home agent to the foreign agent. The name needs only be unique within the home agent, i.e. the path's ingress router. The "to address" statement specifies the care-of IP address allocated to the foreign agent. The "from address' specifies the home agent's IP address. Both IP addresses are sent to the foreign agent at reservation setup so the foreign agent can establish an address resolution table including: LSR tunnel label, home agent IP address, mobile node home network IP address, and mobile node layer 2 address. Two home networks may use overlapping address spaces.

As described above, the label-switched path (LSP) acts as the logical tunnel for packets to be sent between the home agent and the foreign agent. Using a label-switched path as a tunnel provides packet routing advantages. The term routing pertains to the selection of intermediate routers that make up the physical path the packet traverses before reaching the foreign agent. The routing of packets between the home agent and foreign agent in mobile IP is decided by the routing protocols deployed in each ISP network, (i.e., domain), such as OSPF or IS—IS, and a border gateway protocol (BGP) which is an inter-domain protocol for sharing routes between Internet services providers. However, relying on the shortest path calculations, as is done in OSPF or IS—IS, may result in a suboptimal or insecure path. For example, the shortest path between a home agent and a foreign agent may traverse a competing ISP network or over a heavily loaded link with a low quality of service. Therefore, the public mobile IP control entity in accordance with a preferred, example embodiment may determine and select which specific intermediate routers the label-switched path contains. The intermediate hops between specified ingress and egress label-switched routers can either be strict or loose. In contrast to a loose hop, a strict hop does not permit any additional intermediate router in the path between two consecutive router addresses in the path list.

In addition strict and loose paths, primary and secondary paths may also be established to provide redundancy, and therefore increase reliability, as well as alternative routing to avoid congestion. A BNF syntax example for path setup between the mobile IP control entity and the MPLS control entity is as follows:

```
mpls {
    path path-name {
        address < strict | loose>;
        }(1+)
    label-switched-path lsp-path-name {
        primary path-name;
        secondary path-name;(1+)
        }(1+)
}
```

The label-switched path may be secured with one or more secondary paths in case the primary path fails. Secondary paths may also be set up in advance in order to allow a fast rerouting if the primary path fails. In that case, a standby option is then used as reflected in the following example BNF-syntax:

```
mpls {
    label-switched-path lsp-path-name {
        secondary path-name {
            standby;
            }(1+)
        }(1+)
}
```

In mobile IP, the care-of address is a non-confidential IP address of the foreign agent at which a mobile node is currently registered. Similarly, the IP address of the home agent is not secure. The non-confidential nature of the home and foreign agent addresses make the tunnel between the home agent and the foreign agent vulnerable to hostile attacks from outside intruders. This vulnerability is reduced considerably using MPLS as the tunneling protocol. The label identifiers that encapsulate the care-of address as well as the traffic in the tunnel between the home agent and the foreign agent provide a level of security/confidentiality to the tunnel. Since a new label identifier is applied at each router hop along the path of the tunnel, the tunnel itself can be seen as a chain of label swappings. Significantly, a label identifier is not publicly accessible. In fact, only the pair of neighboring routers along the tunnel knows the label identifier for a particular router hop. As a result, the MPLS tunnel is considerably less vulnerable to attacks from intruders. Moreover, in the preferred embodiment, the MPLS control entity employs an RSVP control entity (or similar setup protocol entity for establishing tunnels) with an authentication of sender and receiver procedure to further secure the tunnel against attack.

As the mobile node moves from one foreign agent to another, the new foreign agent's mobile IP control entity injects the mobile node's address into the already-established label-switched path between the old foreign agent and the home agent to maintain the tunnel. This tunnel "handover" permits the data traffic to continue without interruption. Example BNF-style syntax for a new foreign agent address injection procedures with respect to the interface between the mobile IP control entity and the MPLS control entity is as follows:

```
mpls {
    label-switched-path lsp-path-name {
        install destination/mask;(1+)
    }(1+)
}
```

The mobile node home network IP address is included in the "install destination/mask" statement. Multiple "install" statements can be included for the same label-switched path. Each install statement relates to an additional mobile node. In order to reduce the number of individual install statements, several mobile node IP addresses may be grouped into one install statement in case they form a consecutive list of IP addresses, also referred to as a "destination mask."

All incoming IP addresses with a particular destination mask, (the destination mask is the first part of the IP address corresponding to the forwarding equivalence class), are handled in the same fashion, i.e., sent over the same LSP. In the present invention, a set of consecutive mobile node IP addresses is grouped into one destination mask group in order to lower the number of explicit routes in the MPLS routing table for each LSR. For example, if two mobile nodes having IP addresses 10.10.10.1 and 10.10.10.2 are both in the same foreign agent network, the mobile IP control entity has the option of requesting install 10.10.10.1/30" as a single route to carry traffic to the both mobile nodes attached to this foreign agent instead of "install 10.10.10.1" and "install 10.10.10.2" which requires two separateroutes in the routing table of the home agent. Such route aggregation provides increased efficiency and speed in handling and delivering packets by decreasing the route lookup time in the home agent and lowering the number of route advertisements that the home agent sends out on the Internet.

The present invention also permits quality/class of service to be taken into account in mobile IP/Internet communications. In order for the mobile IP control entity to ensure packet treatment in accordance with the quality of service level desired by the mobile node, the interface between the mobile IP control entity and the MPLS control entity allows for the enforcement of a particular class of service, bandwidth, or link color (admin group), etc. Link color may be used to exclude and/or include only certain traffic on a link, i.e., interface to a neighbor router. The operator can via the management interface of the router set a certain color on a link. The color is given a meaning, e.g., only voice-over-IP packets can traverse this link. In the same way, LSPs may also be "colored." When the label-switch router receives a colored packet it is restricted to only forward such a packet on links that have the same color. In such way, one can create paths, i.e., a set of links, that are only used for voice-over-IP traffic which requires low delay.

The agreed service(s) is(are) first specified per label-switched path. Several label-switched paths with varying service level terms may be defined between a foreign agent and a home agent. When the mobile node attaches to the foreign agent network, the mobile IP control entity of the foreign agent assigns the mobile node to a label-switched path having the service level corresponding to that requested by the mobile user. One example way in which this service level agreement may be provided with respect to the interface between the mobile IP control entity and the MPLS control entity is outlined in BNF-style syntax as follows:

```
mpls {
    admin-groups {
        group-name group-value;(1+)
    }
    label-switched-path lsp-path-name {
        admin-group {
            include group-names;(1+)
            exclude group-names;(1+)
        }
        bandwidth bps;
        class-of service class-of-service;
        primary path-name {
            admin-group {
                include group-names;(1+)
                exclude group-names;(1+)
            }
            bandwidth bps;
            class-of-service class-of-service;
        }
        secondary path-name {
            admin-group {
                include group-names;(1+)
                exclude group-names;(1+)
            }
            bandwidth bps;
            class-of-service class-of-service;
        }(1+)
    }(1+)
}
```

As shown in the BNF-style syntax above, the service level agreement may be specified either for the label-switched path as a whole, i.e. both primary and secondary paths, or individually for each of the primary and secondary paths. If the operator chooses to use link coloring to provide quality of service, the operator first defines admin-group values, i.e., link color, on the interfaces of the router. The mobile IP control engine can then use the same admin-group values to color the mobile IP traffic streams. The traffic streams can be colored at different levels, i.e., either at the router (MPLS statement) level, per LSP, or per path-name. The operator may allocate bandwidth to traffic streams in a similar way. First, bandwidth restrictions are set for the interfaces of the network. The mobile IP control engine sets the maximum bandwidth each of the mobile IP traffic streams is allowed to use with a "bandwidth bps" statement. As with the admin-group, the bandwidth parameter may be set at a granularity of LSP or other individual path. Both the admin-group and bandwidth are signaled with the reservation protocol at LSP setup. Each intermediate router decides whether a link can be used based on available bandwidth and matching color. The class-of-service statement, provides a third option for the mobile IP control engine to enforce a particular service quality for a particular mobile IP traffic stream. When an LSP or path is marked with a class-of-service, all packets entering the LSP are marked in the label header. The intermediate routers read the label header and give appropriate priority for the packet.

If the traffic between a home agent and a foreign agent is particularly high, more than one label-switched path (even with the same service level features) may be established in order to cope with the high volume of traffic and to provide redundancy. In order to avoid congestion resulting from all traffic ending up on one of the label-switched paths, load balancing is used between these label-switched paths. The mobile IP control entity distributes the number of mobile node routes being injected into the available plural label-switched paths having the same service level features and foreign agent. The mobile node routes refer to the mobile node home network IP addresses that the home agent advertises to the Internet. The injection process adds new mobile node home network IP addresses to the already established LSP between a home agent address and a foreign agent care-of address.

A label-switched path is a traffic stream. The traffic stream can be routed through the network in many different ways to reach its destination. A path is one such route. Within the single label-switched path, the mobile IP control entity may also load balance between multiple paths. The mobile IP control entity initiates setup of multiple secondary paths without a primary path. The MPLS control entity then load balances between the secondary paths. An example BNF-style syntax for such load balancing between secondary paths with respect to the interface between the mobile IP control entity and the MPLS control entity is set forth below:

```
mpls {
    label-switched-path lsp-path-name {
        preference preference;
        secondary path-name {
            preference preference;
        }(1+)
    }(1+)
}
```

The preference statement is set to the same value for both secondary path that are load-balanced.

Along with the support of service level features and load balancing for individual tunnels is the need for network management to monitor the utilization, errors, and other interesting statistics of tunnels established between home and foreign agents. Included below is example SNMP MIB (Management Information Base) syntax with respect to an MplsLspEntry for collecting such statistical type information.

```
MplsLspEntry ::=
    SEQUENCE {
        mplsLspName              DisplayString,
        mplsLspState             INTEGER,
        mplsLspOctets            Counter64,
        mplsLspPackets           Counter 64,
        mplsLspAge               TimeStamp,
        mplsLspTimeUp            TimeStamp,
        mplsLspPrimaryTimeUp     TimeStamp,
        mplsLspTransitions       Counter32,
        mplsLspLastTransition    TimeStamp,
        mplsLspPathChanges       Counter32,
        mplsLspLastPathChange    Time Stamp,
        mplsLspConfiguredPaths   Integer32,
        mplsLspStandbyPaths      Integer32,
```
-continued
```
        mplsLspOperationalPaths  Integer32,
        mplsLspFrom              IpAddress,
        mplsLspTo                IpAddress,
        mplsPathName             DisplayString,
        mplsPathType             INGETER,
        mplsPathExplicitRoute    OCTET STRING (SIZE (0 . . . 1024)),
        mplsPathRecordRoute      OCTET STRING (SIZE (0 . . . 1024)),
        mplsPathBandwidth        Integer32,
        mplsPathCOS              INTEGER (0 . . . 7 | 255),
        mplsPathInclude          Integer32,
        mplsPathExclude          Integer32,
        mplsPathSetupPriority    INTEGER (0 . . . 7),
        mplsPathHoldPriority     INTEGER (0 . . . 7),
        mplsPathProperties       INTEGER
    }
```

The mplsLspOctets and mplsLspPackets may be used to monitor utilization of the LSP. The mplsLspAge/mplsLspTimeUp and mplsLspTransitions/mplsLspPathChanges may be used to monitor its stability of the LSP. The parameters are defined as follows:

mplsLspOctets
　　The number of octets that have been forwarded over this LSP.
mplsLspPackets
　　The number of packets that have been forwarded over this LSP.
mplsLspAge
　　The age (i.e., time from creation till now) of this LSP in 10-millisecond periods.
mplsLspTimeUp
　　The total time in 10-millisecond units that this LSP has been operational. For example, the percentage up time can be determined by computing (mplsLspTimeUp/mplsLspAge*100%)
mplsLspTransitions
　　The number of state transitions (up->down and down->up) this LSP has undergone.
MplsLspPathChanges
　　The number of path changes this LSP has had.

Reference is now made to example, non-limiting procedures for implementing a public mobile IP service (block 100) shown in flowchart form in FIG. 7. Initially, one or more home agent routers and one or more foreign agent routers are established in a public mobile access network such as network 18 shown in FIG. 1. Preferably, (although not necessarily), home agent routers are located at the Internet backbone point of presence, and foreign agent routers are deployed as local points of presence where mobile nodes make initial contact with the Internet (block 102). The foreign and home agents advertise their respective status as potential mobility agents, and the foreign agents advertise available care-of addresses (block 104). The closest foreign agent to the mobile node may, at the request of the mobile node, assign a care-of address to the mobile node to be used in routing data packets to and from the mobile node at its current point of attachment to the public mobile access network (block 106). The mobile node registers its assigned care-of address with its home agent for each new attachment it makes to the public mobile access network (block 108). The home agent associates the care-of address with the mobile node's home IP address.

For packets with the mobile node's home IP address indicated as their destination address, these packets are routed by the Internet to the home agent which then establishes an MPLS tunnel using a label-switched path through the public mobile access network to the foreign agent using the mobile node's current care of address. The tunnel may be established with certain attributes like quality of service (QoS), bandwidth (BW), a specified path that is not necessarily the shortest path, primary and second paths, balance loading, etc. (block 110). The tunnel may also be established for a particular IP destination mask/MPLS FEC to aggregate packets rather than having to establish and manage parallel tunnels. A parallel, label-switched path is also established in the opposite direction from the mobile node through the tunnel to transport packets from the mobile node to the Internet.

Packets are encapsulated and assigned labels at the home agent, label swapped through the established tunnel, decapsulated by the foreign agent, and forwarded over the radio interface to the mobile node in accordance with the defined tunnel attributes (block 112). Statistical data regarding each established tunnel may be gathered and stored in a management-type database (block 114) in order to determine whether the promised service level is being provided.

Figure 8:
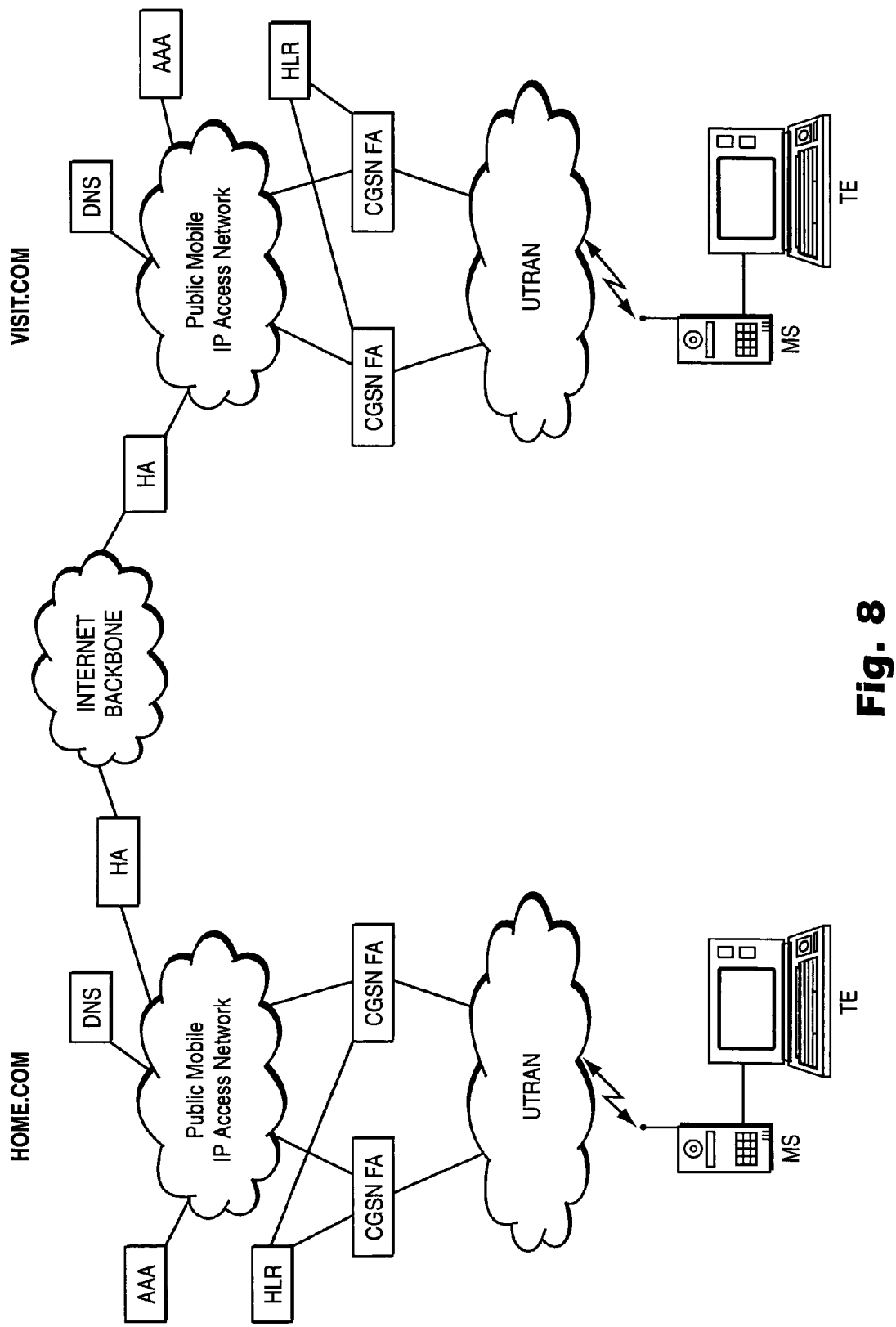
FIG. 8 is a diagram illustrating an example application of the present invention in a specific (although non-limiting) radio access environment.

FIG. 8 shows one example implementation of the present invention in a particular radio access environment. Here the radio access network corresponds to a UMTS terrestrial radio access network (UTRAN) which provides access over the radio interface with the mobile node here shown for example as comprised of a mobile station MS and terminal coupled to a terminal TE. The foreign agent (FA) is co-located with a radio-access specific Combined GPRS Support Node (CGSN). The CGSN includes both the service and gateway aspects of the GPRS Support Node. Significantly, mobility management tunnels are not implemented with a radio-access specific method. Instead, public mobile IP is used to establish terminals between foreign agents (FA) and home agents (HA). Each domain (Home.COM and VISIT.COM) has at least one HA. The HA and FA with the shortest path between the two communicating mobile nodes are used for tunneling. The authentication, authorization and accounting server (AAA) is used to authenticate the mobile nodes. The domain name server (DNS) is used by one AAA server to find the AAA server in the other domain.

Therefore, the public mobile access network in accordance with the present invention provides mobile nodes Internet access while managing mobility so that mobile radio nodes can communicate over the Internet and are reachable by corresponding nodes via the Internet. Using the mobile IP protocol, the present invention eliminates the need for radio access technology specific mobility management hardware and software. By incorporating MPLS as the tunneling protocol for public mobile IP, the present invention provides flexibility (e.g., various service attributes and constraints for individual tunnels, increased security in the label-switched paths, and redundancy by providing secondary alternative label-switched paths to the primary label-switched paths) and efficiency (e.g., aggregating multiple mobile node data packet streams to a single label switched path tunnel between a foreign agent and home agent to reduce the number of paths to manage).

The aggregation and merging of tunnel traffic aspect of the present invention is now described in further detail. Aggregation and merging of tunnel traffic is particularly useful to avoid establishing a large number of tunnels as well as frequent signaling between the mobile node and the home agent, e.g., frequent mobile IP registrations by mobile nodes. Instead, the foreign agent, at a regional point of presence, provides the mobility services to the mobile node within its region. The region may include a set of foreign agents. Mobility registration messages need not go to the home agent as the regional foreign agent is the point of contact for traffic destined for the mobile node. This allows some degree of independence from the home agent and reduces signaling from the home agents.

Reference is made to FIG. 9 which illustrates multiple foreign agents $FA_1$–$FA_6$ arranged hierarchically in a regional topology. The mobile node (MN) may move from one local area of the regional topology to another without requiring approval or care-of address registration to be associated with its home address at the home agent (HA) as explained above. More importantly, the present invention regionalizes packet tunnels between regional, neighbor foreign agents in this topology. Instead of setting up parallel label-switched paths or tunnels from multiple local foreign agents in the upstream direction to the home agent, the present invention merges those parallel label-switched paths into a single tunnel so that each foreign agent branch is added to the main trunk tunnel to the home agent. Therefore, in the upstream direction, a regional foreign agent swaps the set of labels for each locally-initiated, label-switched path to a common label related to the hierarchical, tree trunk, label-switched path used to the home agent. In the downstream direction, the home agent encapsulates the label associated with each individual regional foreign agent into a set of labels associated with all of the regionalized foreign agents $FA_1$–$FA_6$. As the packet is passed down the hierarchy, each regional foreign agent along the path pops the label in the label stack that is associated with that foreign agent and routes the packet further based on the next visible label in the label stack. Example non-limiting procedures in BNF syntax for implementing the tunnel aggregating/merging aspect of the invention with respect to the interface between the mobile IP control entity and the MPLS control entity are as follows:

```
mpls {
    interface interface-name {
        label-map in-label {
            (nexhop address) | (reject | (discard);
            (pop | (swap <out-label>);
        }
    }
    static-path inet {
        prefix {
            nexhop address;
            push out-label;
        }(1+)
    }(1+)
}
```

Here the local foreign agent $FA_5$ in FIG. 9 sets a neighbor address of a path to another regional foreign agent $FA_3$ in FIG. 9 and "pushes" (i.e., encapsulates the IP packet with a label), an out-label in a handshake operation with the regional foreign agent $FA_3$. The regional foreign agent $FA_3$ defines a label-map with the same label as the in-label in an interface statement. The regional foreign agent $FA_3$ in FIG. 9 swaps labels to a new out-label "handshaked" with another regional foreign agent $FA_1$ in FIG. 9 higher up in the hierarchy. Eventually, the home agent HA in FIG. 9 pops (i.e., removes)the out-label and routes the packets in accordance with the destination IP header of the corresponding node.

In the downstream direction, the home agent associates an out-label with each local foreign agent in a path statement. In addition, the home agent encapsulates the packets into a set of new labels associated with each new regional foreign agent along the hierarchical tree to the local foreign agent.

When receiving packets with an agreed intermediate label, the regional foreign agent pops the label and routes to the local or next level foreign agent label instead. Eventually, the local foreign agent pops the last label in order to route the packet to the mobile node based on the mobile node's IP address.

FIG. 10 illustrates an example, nonlimiting tunnel regionalization routine (block 150). Label-switched paths are merged from plural, regional, foreign agents in the upstream direction towards the home agent (block 152). The home agent encapsulates the label associated with each local foreign agent (in this example, the local foreign agent is $FA_5$ where the mobile node is attached) to a set of labels associated with the complete set of regional foreign agents (e.g., $FA_1$–$FA_6$) (block 154). The downstream label-switched paths to the regional foreign agents are therefore aggregated in a tree-type hierarchy contrasted with parallel paths or tunnels.

Another aspect of the present invention relates to data packet routing optimization. In one example of such route optimization is the definition of a virtual home agent network for mobile node home IP addresses. A set of routers is defined as home agents for that virtual home network. Because home agents are preferably deployed at the backbone point of presence in the public mobile access network, they may very well be integrated with (e.g., simply by adding software) traditional border gateway routers. As a result, each home agent represents a single point of failure. To overcome this drawback, the present invention provides home agent redundancy. In other words, two or more border gateway routers at the backbone point of presence of the public mobile access network are each configured to act as the home agent for a mobile node. Stated another way, a virtual home agent network is configured for each mobile node. Mobile IP registration messages from mobile nodes are sent from current foreign agents to all of the redundant home agents in the virtual home agent network. Consequently, any of the home agents in the virtual home agent network may forward packets to and from a mobile node allowing for redundancy as well as for route optimization.

For incoming traffic addressed to a mobile node's care-of address, the home agent router in the virtual home agent network advertising the shortest path between a corresponding node and the mobile node is the home agent that encapsulates packets received from the corresponding node and forwards them over an appropriate MPLS tunnel to the foreign agent. Thus, depending on the location of the corresponding node, the choice of the home agent in the virtual home agent network may vary. By selecting from the pool of home agents in the virtual home agent network the closest home agent, packets being routed to the mobile node based on the care-off IP address are routed as quickly as possible. In the opposite direction, the foreign agent simply multicasts the mobile IP registration messages to those home agents included in the virtual home agent network.

For internetwork traffic, at least some of the home agents in the virtual home agent network are preferably placed at points in the public mobile access network where incoming traffic is received from other networks. This position corresponds to a backbone point of presence/border gateway protocol router. To handle local traffic in a private/corporate network, one of the home agents in the virtual home agent network and the foreign agent may be co-located.

In one non-limiting, example implementation, a multi-exit discriminator (MED) parameter in the border gateway protocol (BGP) may be used to give corresponding nodes information regarding which path is preferred for a specific mobile node destination prefix. The MED with the lowest value is preferred by a corresponding node. The HA can manipulate the MED parameter for route advertisements so that it becomes the preferred HA to reach a mobile node. The other HAs are only used by the corresponding node in case of failure of the preferred HA. The multi-exit discriminator therefore gives hints to external corresponding nodes about a preferred path in the public mobile access network which has multiple entry points. Thus, the multi-exit discriminator parameter can also be used for load balancing if the preference value is set differently for different sets of mobile nodes. In that case, some traffic passes via $HA_2$ in FIG. 12 and other traffic passes via $HA_4$ in FIG. 12. Similar route optimization applies in the upstream, outgoing traffic direction. Packets from the mobile station/foreign agent are decapsulated as early as possible in order to achieve the shortest path routing to the corresponding node. In this regard, a co-located foreign/home agent (if present) provides an optimal decapsulation point. This situation is also optimal because no tunneling is performed for the purpose of mobility.

Figure 11:
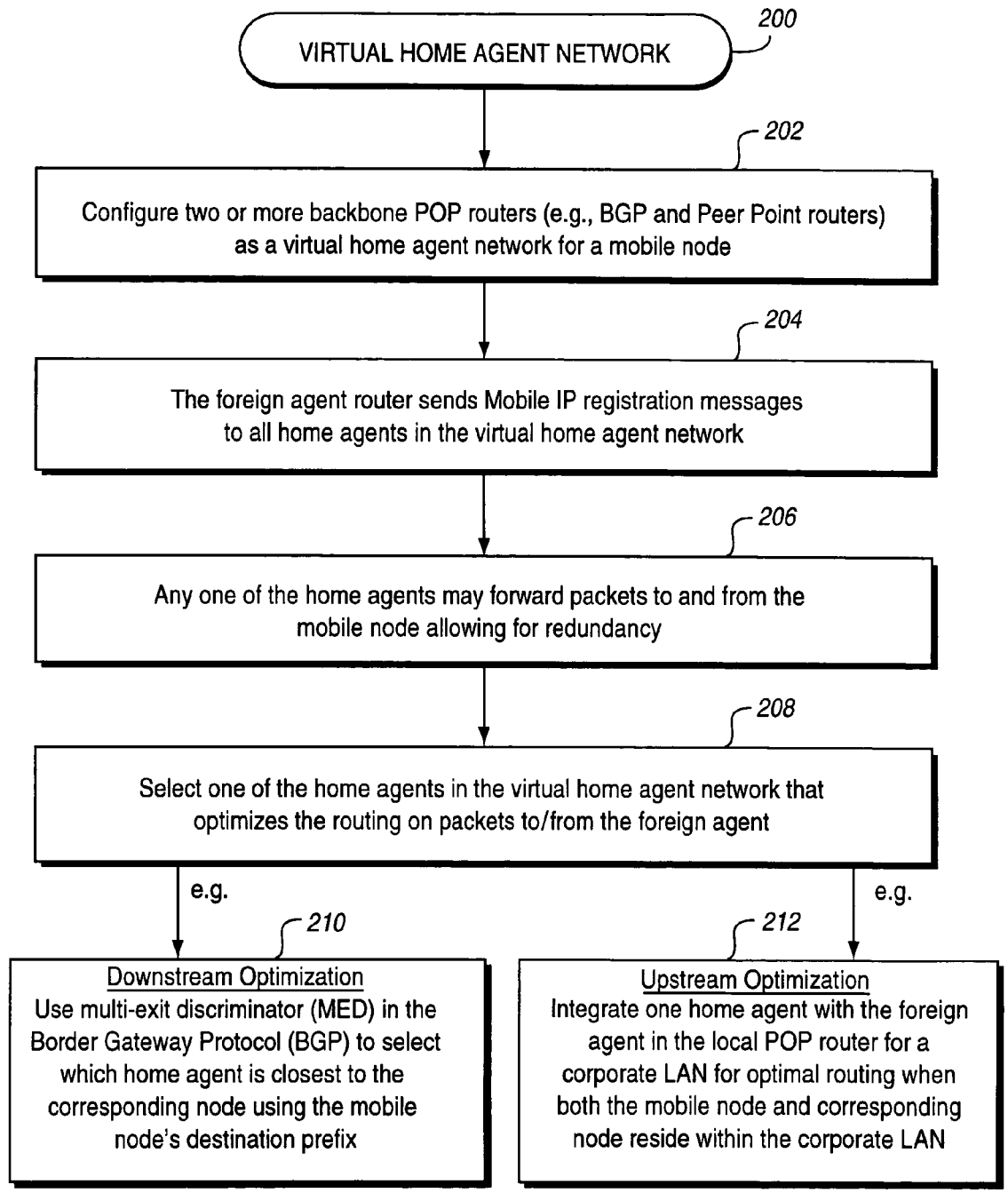
FIG. 11 is a flowchart diagram illustrating an example virtual home agent network procedure.

Reference is made to the example virtual home agent network routine (block 200) shown in flowchart form in FIG. 11. Two or more backbone, point of presence routers (e.g., border gateway protocol and peer point routers) are registered as a virtual home agent network for a mobile node. The registration can either be static (performed via the management interface of the router) or dynamic (decided based on subscription options in a authorization server (AAA). The foreign agent router therefore sends mobile IP registration messages from a particular mobile node to all home agents in the virtual home agent network (block 204). Any one of the home agents in the virtual home agent network may forward packets to and from the mobile node allowing for path redundancy (block 206). The corresponding node selects one of the home agents in the virtual home agent network that optimizes the routing of packets to/from the foreign agent (block 208). The optimal home agent may be determined in the same way as for normal IP routing, i.e., based on routing protocols such as OSPF and BGP. While this optimal routing might be the shortest path, it may also accommodate other optimizing criteria such as load balancing between various paths through the manipulation of the MED by the home agent at mobile node route advertisements towards the corresponding node.

One example of optimal routing to/from the foreign agent (block 210) uses the multi-exit discriminator (MED) tool in the border gateway protocol (BGP) to select which home agent is closest to the corresponding node using the mobile node's IP address destination prefix (block 210). The same selection process can be employed in the opposite, outgoing traffic direction. Another example of optimal routing by home agent selection includes integrating co-locating one of the home agents in the virtual home agent network with the foreign agent in the local point of presence router for a corporate local area network (LAN) (block 212). This of course achieves optimal routing in situations where both the mobile node and the corresponding node reside within the corporate LAN as well as for fetching web documents from a web cache placed in the local point of presence.

Figure 12:
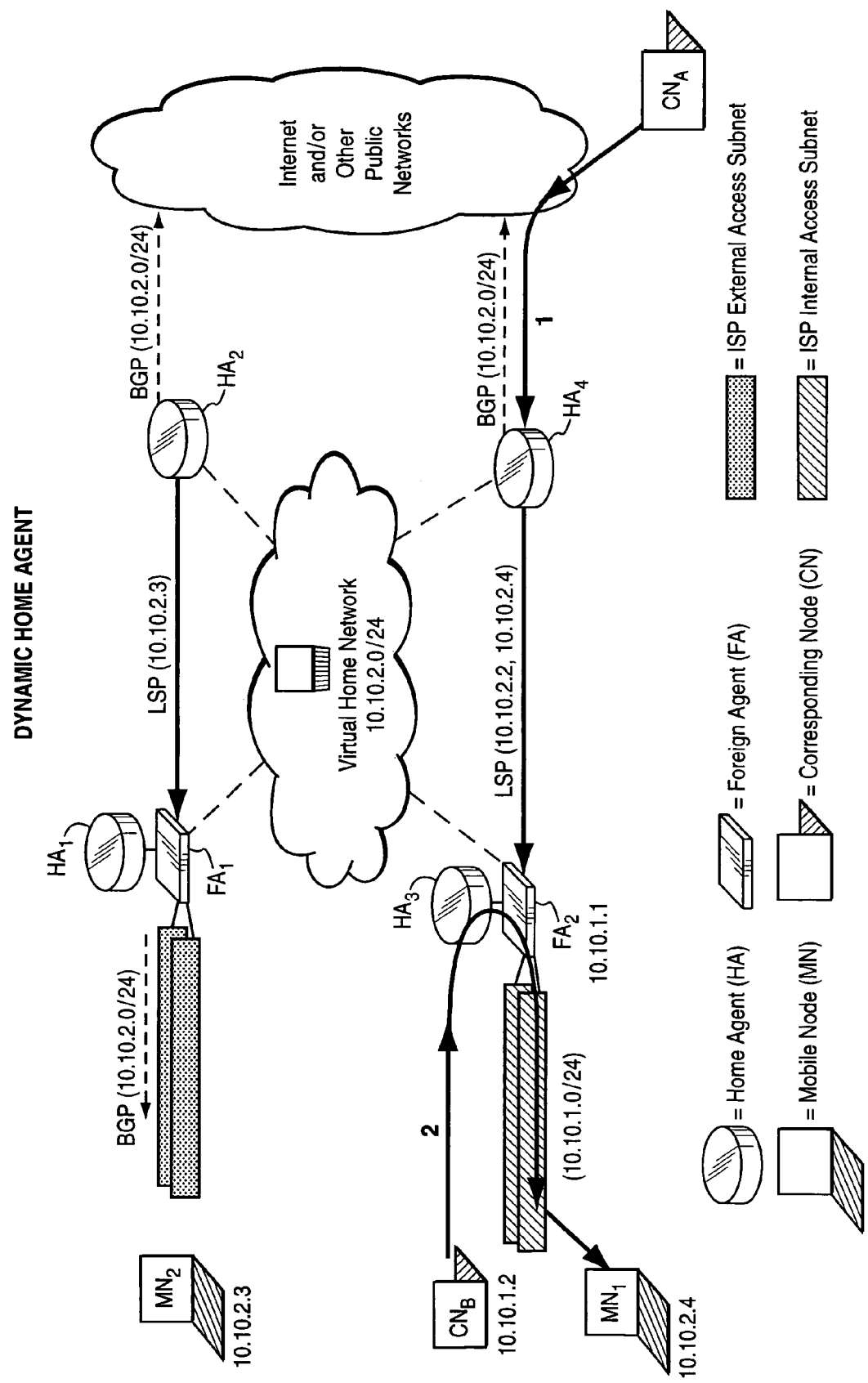
FIG. 12 illustrates another example embodiment of the present invention in which plural home agents are employed in the non-limiting context of a virtual home agent network.

An illustrative example of route optimization using a virtual home agent network is illustrated in FIG. 12. Consider a first example where a corresponding node $CN_A$ attached to the Internet and/or other public networks wants to send data packets to a mobile node $MN_1$ having an IP address of 10.10.2.4. The virtual home network for this mobile node $MN_1$ includes four home agents ($HA_1$–$HA_4$)

that serve the IP destination address mask 10.10.2.0/24 including mobile node $MN_1$ having address 10.10.2.4 but also the mobile node $MN_2$ having an IP address of 10.10.2.3. Data packets from the corresponding node $CN_A$ are routed over routing path 1 from the Internet to the closest home agent ($HA_4$) and then tunneled over the label-switched path (LSP) for mobile node home addresses 10.10.2.2 and 10.10.2.4. The foreign agent ($FA_2$) belongs to the IP address subnetwork 10.10.1.0/24 to which the mobile node $MN_1$ is temporarily attached. The foreign agent $FA_2$ uses its address 10.10.1.1 as the care-of address for mobile node $MN_1$ in its communication with the home agents. When receiving packets from the home agent $HA_4$, the foreign agent $FA_2$ removes the tunnel header and routes the information to the mobile node $MN_1$ at IP address 10.10.2.4 based on its layer 2 address. This is a shorter path than if the packets from the $CN_A$ were routed to home agent $HA_2$.

Another example optimal routing path 2 is shown between corresponding node $CN_B$ having an IP address of 10.10.1.2 to the mobile node $MN_1$ with a home network address of 10.10.2.4, but a care-of address of 10.10.1.1. Since both of these nodes are currently located in the same local network, the data packets are routed to home agent $HA_3$ which is co-located with mobile node's foreign agent $FA_2$ allowing for a direct internal access to the mobile node. $HA_3$ is selected because of its close proximity to $CN_B$. The home agent $HA_3$ advertises to $CN_B$ a shorter distance (a lower metric) than the other home agents for reaching $MN_1$ at its care-of address 10.10.1.1. As $HA_3$ and $CN_B$ are on the same subnetwork 10.10.1.0/24, the advertisement of route 10.10.1.1 is done using the address resolution protocol (ARP). In the more general case where the corresponding node and the home agent are not on the same subnetwork, the border gateway protocol (BGP) or open shortest path first (OSPF) protocol is used in addition to the address resolution protocol (ARP) to convey the route advertisement. The latter is the case for the advertisement of routes from $HA_4$ to $CN_A$ in the example above.

Figure 13:
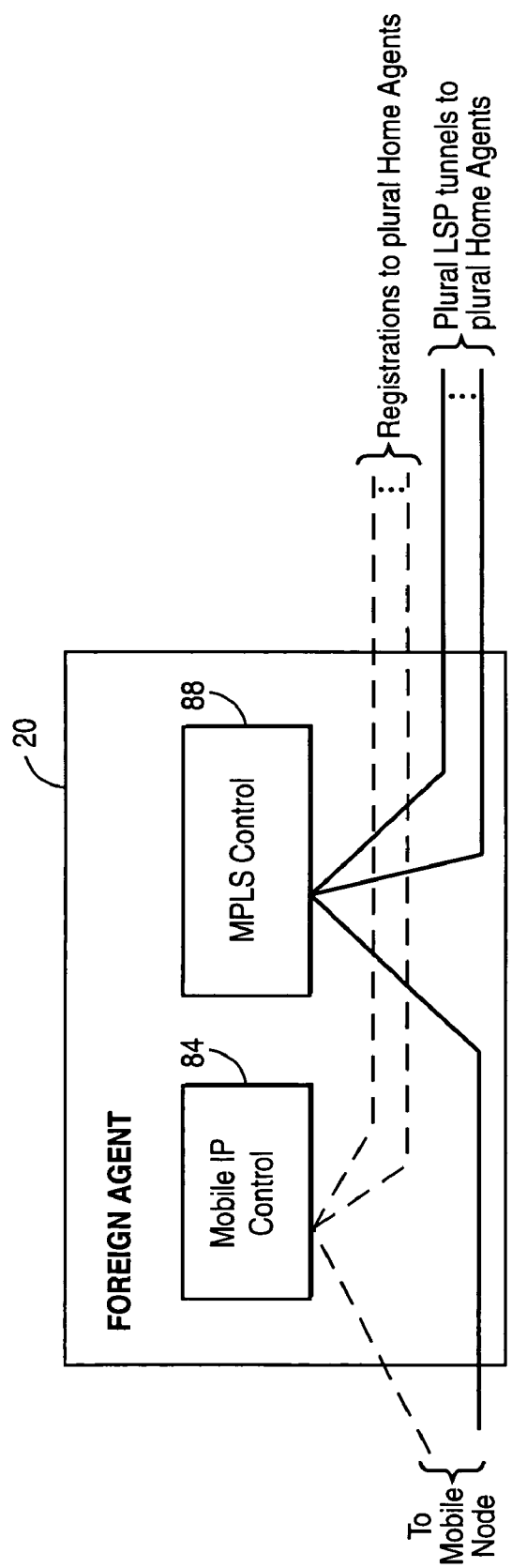
FIG. 13 is an illustration of plural control signals and plural label-switched path tunnels from a foreign agent to plural homes agents.

FIG. 13 illustrates in simplified form control signaling (shown in dashed lines) and traffic paths (shown in solid lines) for a foreign agent node in the virtual home agent configuration. The mobile IP control entity 84 handles the broadcast of mobile IP address registrations from the mobile node to plural home agents. The MPLS control entity 88 manages routing of packets from the mobile node to plural label-switched tunnels to plural home agents in the virtual home agent network.

Figure 14B:
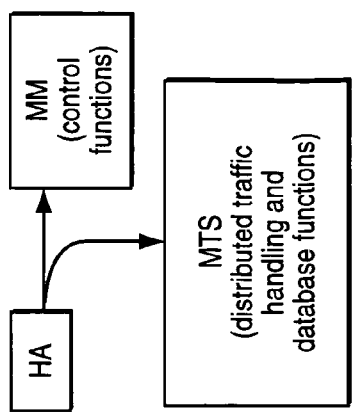
FIGS. 14A and 14B illustrate another example, non-limiting embodiment of the present invention in which functions of the home agent have been divided into a mobility manager node and plural mobility tunnel server nodes.
Figure 14A:
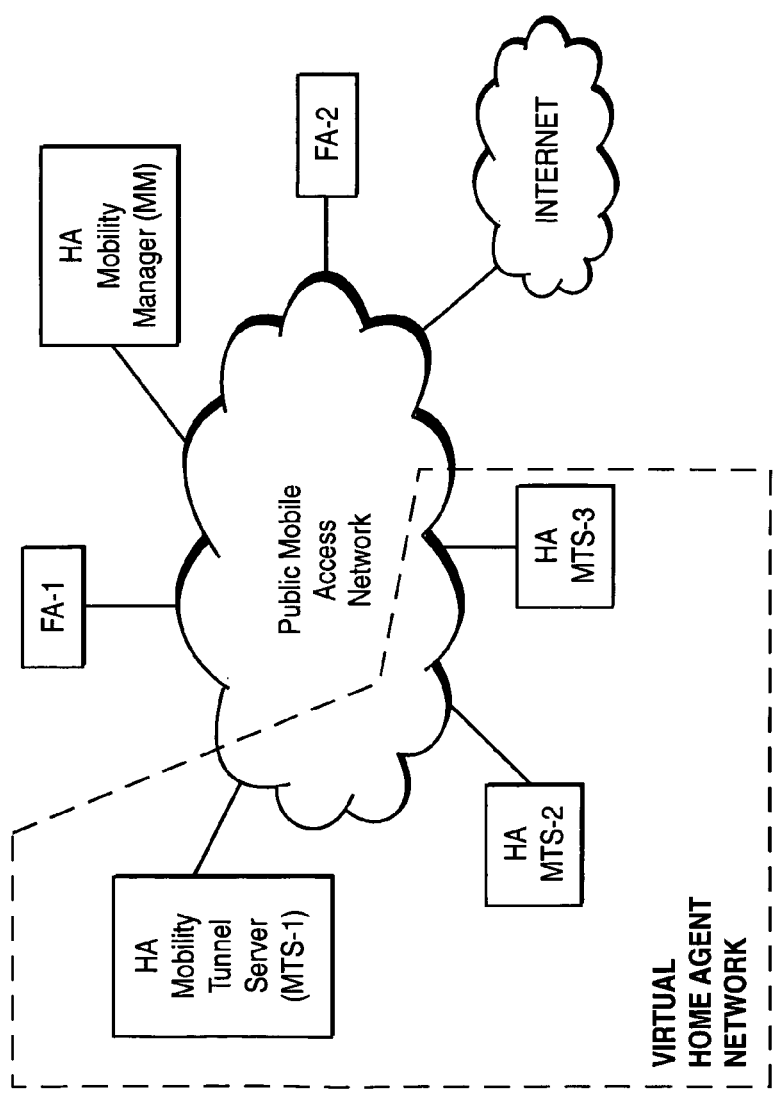

Another aspect of the present invention is now described in the context of FIGS. 14A and 14B. In this implementation, the home agent functionality has been divided to control functionality which is implemented in a single mobility manager (MM) node. This division is represented symbolically in FIG. 14B where the home agent is split into two different blocks including a mobility management block (MM) which manages control mobility control functions like registration, and a mobile tunnel server (MTS) whose function includes distributed traffic handling and databasing functions.

FIG. 14A shows a single home agent mobility manager (MM) node attached to the public mobile access network in addition to foreign agents $FA_1$ and $FA_2$. In addition, three home agent mobility tunnel servers (MTSs) are coupled at different points to the public mobile access network and are configured as a virtual home agent network. This division of functionality offers increased flexibility and scalability to a particular situation. The foreign agents need only send registration and binding update messages to the mobility manager (MM). The MM in turn selects a mobility tunnel server (MTS) based on subscription information and the mobile node's geographical location. Other advantages include load sharing through the use of two or more mobility tunnel servers for a foreign agent, a clear division between traffic handling (MTS) and control (MM) allowing the separate optimization of location and capacity, and the ability to select and configure the shortest possible tunnel by selecting the mobility tunnel server closest to the mobile node and/or the corresponding node if the corresponding node is also directly coupled to the public mobile access network.

Regarding this last advantage, the virtual home agent network looks like a multi-exit network to the foreign agents who simply set their MPLS tunnel endpoint to the virtual home network agent network address. The home agent mobility manager controls the distributed mobility tunnel servers in the sense that the foreign agents and mobility tunnel servers send home agent control signaling towards the HA mobility manager. This means that up stream traffic from the mobile node towards the Internet/Public mobile access network is optimized. By placing the home agent mobility tunnel servers near entrance points to the public mobile access network and/or the foreign agents, tunnels with reduced lengths can be achieved. This also enhances the public mobile access network's capability to interface with optimization algorithms at the application layer, such as web caching and load balancing between web servers. The public mobile access network can find a shortest path to the destination even if it may be a web cache in a local point of presence or a web server in a backbone point of presence. In the case of a combined home agents and foreign agent in the local point of presence, the tunneling (encapsulation and de-capsulation) of packets can be avoided and security handshake procedures eliminated.

While the present invention has been described in terms of a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. For use in an Internet, a public mobile access data network providing a mobile node data access to the Internet and data access to the mobile node from the Internet when a point of attachment of the mobile node to the public mobile access data network changes, comprising:

a home agent router coupled to a backbone of the Internet;

plural foreign agent routers coupled to the home agent router for communicating with one or more mobile nodes, wherein the home agent and foreign agent routers communicate using a mobile internet protocol and a tunnel that includes a label switched path that uses multi-protocol label switching, and wherein as the mobile node moves from one foreign agent to another foreign agent, the home agent is configured to inject an address associated with the mobile node into the label switched path.

2. The public mobile access data network of claim 1, wherein one or more tunnels are established between ones of the plural home agent routers and ones of the plural foreign agent routers such that a mobile node communicating over one of the tunnels associated with a first foreign agent continues that communication over another of the tunnels associated with a second foreign agent.

3. The public mobile access data network of claim 2, wherein the first and second tunnels are established to be relatively static to handle different communications with different mobile nodes.

4. The public mobile access data network of claim 3, wherein a care-of address of the mobile node associated with the first foreign agent is changed when the communication is continued over the other tunnel associated with the second foreign agent.

5. The public mobile access data network of claim 1,
wherein the tunnel is dynamically established using one or more variable service parameters.

6. The public mobile access data network of claim 5, wherein the one or more variable service parameters used to configure the data tunnel include one or more of the following: quality of service, bandwidth, primary and secondary paths, and a certain type of traffic limitation.

7. The public mobile access data network of claim 1, wherein the radio access technology specific network includes GSM/GPRS.

8. The public mobile access data network of claim 1, wherein the radio access technology specific network includes D-AMPS.

9. The public mobile access data network of claim 1, wherein the public mobile access data network is operated by an Internet service provider (ISP).

10. The public mobile access data network of claim 1, wherein one or more of the foreign agent routers is located at a local point of presence near a radio access point where the mobile node attaches to the public mobile access data network.

11. The public mobile access data network of claim 1, wherein the mobile node de-attaches from the public mobile access data network at one of the foreign agents and re-attaches to the public mobile access data network at another one of the foreign agents.

12. The public mobile access data network of claim 1, wherein the home agent router and one of the foreign agents are co-located.

13. The public mobile access data network of claim 1, wherein one of the foreign agent routers serving the mobile node is configured to send registration messages to all home agent routers in the virtual home agent network.

14. The public mobile access data network of claim 1, further comprising:
plural home agents configured as a virtual home agent network for one of the mobile nodes,
wherein if one of the home agents in the virtual home agent network is dysfunctional, another of the home agents in the virtual home agent network is configured to forward data to and from the mobile node.

15. The public mobile access data network of claim 1, further comprising:
plural home agents configured as a virtual home agent network for one of the mobile nodes,
wherein one of the home agents in the virtual home agent network closest to a corresponding node sending data to the mobile node via the Internet is configured to forward data to and from the mobile node.

16. The public mobile access data network of claim 15, wherein the closest home agent has a smallest routing metric relative to the corresponding node.

17. The public mobile access data network of claim 1, wherein one of the home agents is configured to use a multi-exit discriminator parameter to advertise to the Internet a preferred entry point to the public mobile access data network.

18. A method comprising:
configuring a public mobile access data network to provide public data access between an Internet and a mobile node which is attachable to various points of the public mobile access data network over a radio interface;
providing multiple home agents coupled to a backbone of the Internet;
providing plural foreign agents coupled to the home agent for communicating with one or more mobile nodes;
configuring plural home agents as a virtual home agent network for one of the mobile nodes; and
one of the foreign agents serving the mobile node sending registration messages to all home agents in the virtual home agent network;
wherein the home agent and foreign agent routers communicate using a mobile internet protocol (IP) and a tunnel that includes a label switched path using multi-protocol label switching (MPLS), wherein the home agent and foreign agent are label switched routers at the ends of the label switched path, and wherein the label switched routers encapsulate incoming data packets with a label, remove a label from outgoing data packets, and route data packets by swapping labels at each label switched router along the label switched path.

19. The method in claim 18,
wherein any one of the home agents in the virtual home agent network may forward data to and from the mobile node.

20. The method in claim 18, wherein if one of the home agents in the virtual home agent network is dysfunctional, another of the home agents in the virtual home agent network forwards data to and form the mobile node.

21. The method in claim 18, further comprising:
selecting one of the home agents in the virtual home agent network closest to a corresponding node sending data to the mobile node via the Internet to forward data to and from the mobile node.

22. The method in claim 18, wherein one of the home agents in the virtual home agent network is co-located with a foreign agent router near a private data access network.

23. The method in claim 18 further comprising:
the home agent establishing the tunnel with the foreign agent using the care-of address and one or more desired tunnel attributes.

24. The method in claim 23, wherein the one or more desired tunnel attributes includes a class of service, bandwidth, traffic type, primary and secondary paths, or selective routing.

25. The method in claim 18, further comprising:
merging label switched paths from plural regional foreign agents toward the home agent.

26. The method in claim 18, further comprising:
aggregating label switched paths at the home agent for plural regional foreign agents.

27. The method in claim 18, further comprising:
determining the route of the label switched path corresponding to the tunnel to be something other than the shortest route through the public mobile access data network.

28. The method in claim 18, further comprising:
determining a primary label switched path and a redundant, secondary label switched path corresponding to the tunnel.

29. The method in claim 18, further comprising:
selecting one of two or more label switched paths to balance a traffic load in the public mobile data access data network.

30. The method in claim 18, further comprising:
offering in the public mobile access data network a public mobility service to locate current locations of mobile nodes so that the Internet is aware of a current point of attachment of one or more mobile nodes to the public mobile access data network.

31. The method in claim 30, wherein the public mobility service is provided independently of a mobility service offered by a radio access technology specific network.

32. The method in claim 18, wherein one or more of the foreign agents is located at a local point of presence near a radio access point where the mobile node attaches to the public mobile access data network.

33. The method in claim 18, wherein one of the home agents and one of the foreign agents are co-located.

34. The method in claim 33, wherein reciprocal signaling between the home and foreign agents is reduced when the home and foreign agents are co-located.

35. The method in claim 18, further comprising:
forwarding a mobile node registration to plural home agent routing nodes.

36. The method in claim 18, further comprising:
monitoring parameters relating to the tunnel.

37. The method in claim 18, wherein any one of the home agents in the virtual home agent network may forward data to and from the mobile node, the method further comprising:
one of the home agents using a multi-discriminator parameter to advertise to the Internet a preferred entry point to the public mobile access data network.

38. For use in a public mobile access data network providing a mobile node data access to the Internet and data access to the mobile node from the Internet, a first routing node comprising:
a control entity for establishing a label switched path across the public mobile access data network between the first routing node and a second routing node; and
a forwarding entity for processing and routing packets over the label switched path;
wherein the control entity includes a mobile internet protocol (IP) controller interfacing a multi-protocol label switching (MPLS) controller for setting up and controlling the label switched path.

39. The routing node in claim 38, wherein the first routing node is a home agent and the second routing node is a foreign agent.

40. The routing node in claim 38, wherein the routing node is coupled to an authentication serving node to ensure the label switched path communications are authorized.

41. The routing node in claim 38, wherein mobile IP packets are transferred over an MPLS tunnel.

42. The routing node in claim 38, wherein the first routing node is a home agent and the second routing node is a foreign agent and wherein the mobile IP controller is configured to store a care-of IP address of the foreign agent hosting the mobile node.

43. The routing node in claim 38, wherein the first routing node is a foreign agent and the second routing node is a home agent and wherein the mobile IP controller is configured to store an IP address of the home agent for the mobile node.

44. The routing node in claim 38, wherein the mobile IP controller is configured to determine the route of the label switched path to be something other than the shortest route.

45. The routing node in claim 38, wherein the mobile IP controller is configured to determine a primary label switched path and a redundant, secondary label switched path.

46. The routing node in claim 38, wherein the mobile IP controller is configured to select a label switched path to balance a traffic load in the public mobile data access data network.

47. The routing node in claim 38, further comprising:
a resource reservation protocol controller coupled to the MPLS controller.

48. The routing node in claim 38, wherein the first routing node is a foreign agent, the second routing node is a home agent, and the mobile IP controller is configured to request the MPLS controller to establish a table including the label switched path, an address of the home agent, and an address of the mobile node.

49. The routing node in claim 38, wherein the mobile IP controller in the home agent is configured to add one or more mobile node IP addresses to a label switched path having a destination address corresponding to a foreign agent care-of address.

50. The routing node in claim 38, wherein the first routing node is a foreign agent, and wherein the mobile IP controller is configured to forward a mobile node registration to plural home agent routing nodes.

51. The routing node in claim 38, wherein the first routing node is a foreign agent, and wherein the MPLS controller is configured to establish for a single communication with the mobile node plural label switched paths to plural home agent routing nodes.

52. The routing node in claim 38,
wherein the control entity configures the label switched path using one of more variable service parameters.

53. The routing node in claim 52, wherein the one or more variable service parameters used to configure the label switched path include the following: quality of service, bandwidth, primary and secondary paths, and a certain type of traffic.

* * * * *